US012545351B2

(12) United States Patent
Doerksen et al.

(10) Patent No.: US 12,545,351 B2
(45) Date of Patent: Feb. 10, 2026

(54) VIBRATIONAL NOTIFICATION OF MOTOR CONDITIONS IN A SELF-BALANCING ELECTRIC VEHICLE

(71) Applicant: Future Motion, Inc., Santa Cruz, CA (US)

(72) Inventors: Kyle Jonathan Doerksen, Santa Cruz, CA (US); Daniel James Wood, Camas, WA (US)

(73) Assignee: Future Motion, Inc., Santa Cruz, CA (US)

( * ) Notice: Subject to any disclaimer, the term of this patent is extended or adjusted under 35 U.S.C. 154(b) by 0 days.

(21) Appl. No.: 18/440,547

(22) Filed: Feb. 13, 2024

(65) Prior Publication Data
US 2025/0091680 A1  Mar. 20, 2025

Related U.S. Application Data

(60) Provisional application No. 63/583,946, filed on Sep. 20, 2023.

(51) Int. Cl.
B62J 50/22 (2020.01)
B62J 43/30 (2020.01)
B62J 45/412 (2020.01)
B62K 11/00 (2006.01)
B62M 7/12 (2006.01)

(52) U.S. Cl.
CPC ............... *B62J 50/22* (2020.02); *B62J 43/30* (2020.02); *B62K 11/007* (2016.11); *B62M 7/12* (2013.01); *B62J 45/412* (2020.02)

(58) Field of Classification Search
CPC ............ B62J 1/00–99/00; B62K 11/00–11/14; B62M 7/12; B60K 35/00–35/90
USPC ............................................................ 701/22
See application file for complete search history.

(56) References Cited

U.S. PATENT DOCUMENTS

| 6,037,726 | A | * | 3/2000 | Tabata ..................... B62M 7/12 388/827 |
| 10,013,858 | B2 | * | 7/2018 | Zerick ....................... G08B 6/00 |
| 10,167,036 | B2 | * | 1/2019 | Ying ...................... B62D 51/02 |
| 10,392,075 | B2 | * | 8/2019 | Otsuki ................. B62K 11/007 |
| 10,583,886 | B2 | * | 3/2020 | Li ........................... B62K 23/08 |
| 10,607,457 | B1 | * | 3/2020 | Ollander .................. G08B 3/10 |
| 10,926,780 | B2 | * | 2/2021 | Giraud .................. B60W 50/16 |
| 11,299,059 | B1 |   | 4/2022 | De La Rua et al. |
| 11,325,021 | B1 | * | 5/2022 | McCosker ............. A63C 17/12 |
| 2012/0081217 | A1 | * | 4/2012 | Tamaki .................... B62J 43/28 340/425.5 |

(Continued)

FOREIGN PATENT DOCUMENTS

JP   2010149575 A   7/2010
JP   2016088321 A   5/2016

*Primary Examiner* — Mohamed Abdo Algehaim
(74) *Attorney, Agent, or Firm* — Kolitch Romano Dascenzo Gates LLP

(57) ABSTRACT

A method for vibrationally notifying a rider of a self-balancing electric vehicle may include: operating a self-balancing electric vehicle, receiving, at a motor controller of a self-balancing electric vehicle, a measured value corresponding to a first parameter of the self-balancing electric vehicle, and applying a first pattern of vibrational impulses to a motor of the self-balancing electric vehicle in response to the self-balancing electric vehicle satisfying a first operational threshold value.

20 Claims, 12 Drawing Sheets

(56) References Cited

U.S. PATENT DOCUMENTS

| | | | | |
|---|---|---|---|---|
| 2013/0013138 | A1* | 1/2013 | Lu | B60L 3/0061 |
| | | | | 702/34 |
| 2015/0015125 | A1* | 1/2015 | Webber | H02K 11/215 |
| | | | | 301/59 |
| 2015/0075881 | A1* | 3/2015 | Liu | B62K 1/00 |
| | | | | 180/21 |
| 2015/0084576 | A1* | 3/2015 | Magee | H02P 6/183 |
| | | | | 318/768 |
| 2015/0306514 | A1* | 10/2015 | Mimlitch, III | A63H 33/42 |
| | | | | 446/454 |
| 2016/0031525 | A1* | 2/2016 | Craven | B62K 25/02 |
| | | | | 180/206.7 |
| 2016/0121198 | A1* | 5/2016 | Doerksen | B62D 51/02 |
| | | | | 701/22 |
| 2016/0243927 | A1* | 8/2016 | Biderman | G07C 5/008 |
| 2016/0311322 | A1* | 10/2016 | Lagant | B62M 6/65 |
| 2016/0339328 | A1* | 11/2016 | Simeray | B60L 53/00 |
| 2016/0375825 | A1* | 12/2016 | Xie | B60Q 9/00 |
| | | | | 340/438 |
| 2017/0157497 | A1 | 6/2017 | Doerksen | |
| 2017/0160392 | A1* | 6/2017 | Brisimitzakis | G01S 7/24 |
| 2017/0349230 | A1* | 12/2017 | Doerksen | B62J 45/42 |
| 2018/0127047 | A1* | 5/2018 | Lankford | B60L 3/08 |
| 2018/0127048 | A1* | 5/2018 | Li | B62J 45/415 |
| 2018/0208076 | A1* | 7/2018 | Chen | B62J 45/4152 |
| 2019/0176919 | A1* | 6/2019 | Santucci | B62M 7/12 |
| 2019/0248439 | A1* | 8/2019 | Wang | B62K 11/10 |
| 2020/0242922 | A1* | 7/2020 | Dulberg | G01S 5/06 |
| 2020/0254327 | A1* | 8/2020 | Doerksen | B60L 1/14 |
| 2020/0294401 | A1* | 9/2020 | Kerecsen | G07C 5/008 |
| 2021/0008439 | A1* | 1/2021 | Doerksen | A63C 17/12 |
| 2021/0171057 | A1* | 6/2021 | Giraud | B62J 1/28 |
| 2021/0179223 | A1* | 6/2021 | Charalampous | B62J 45/20 |
| 2021/0188270 | A1* | 6/2021 | Horn | B60W 50/14 |
| 2021/0239477 | A1* | 8/2021 | Norville | B60L 15/00 |
| 2021/0247196 | A1* | 8/2021 | Wells | G06Q 10/02 |
| 2022/0003618 | A1* | 1/2022 | Van Rens | A63B 21/0051 |
| 2022/0340225 | A1* | 10/2022 | Iizuka | B62J 50/225 |
| 2022/0411015 | A1* | 12/2022 | Schieffelin | B62K 5/027 |
| 2023/0098779 | A1* | 3/2023 | Mankowski | B62J 27/00 |
| | | | | 340/425.5 |
| 2023/0120664 | A1* | 4/2023 | De La Rua | B62J 45/00 |
| | | | | 307/9.1 |
| 2023/0174194 | A1* | 6/2023 | Hahn | G01L 3/102 |
| | | | | 180/206.3 |
| 2023/0192227 | A1* | 6/2023 | Wismann | B62K 21/12 |
| | | | | 701/60 |
| 2023/0202608 | A1* | 6/2023 | Stephens | B62M 6/55 |
| | | | | 180/206.3 |
| 2023/0218978 | A1* | 7/2023 | Doerksen | A63C 17/08 |
| | | | | 180/181 |
| 2023/0294791 | A1* | 9/2023 | Hahn | B62M 9/123 |
| | | | | 701/22 |
| 2023/0337776 | A1* | 10/2023 | Jhang | G08B 21/02 |
| 2023/0384106 | A1* | 11/2023 | Fanning | B62J 45/20 |
| 2024/0085983 | A1* | 3/2024 | Drayna | G06F 3/017 |
| 2024/0297602 | A1* | 9/2024 | Johnson | H02P 21/36 |

\* cited by examiner

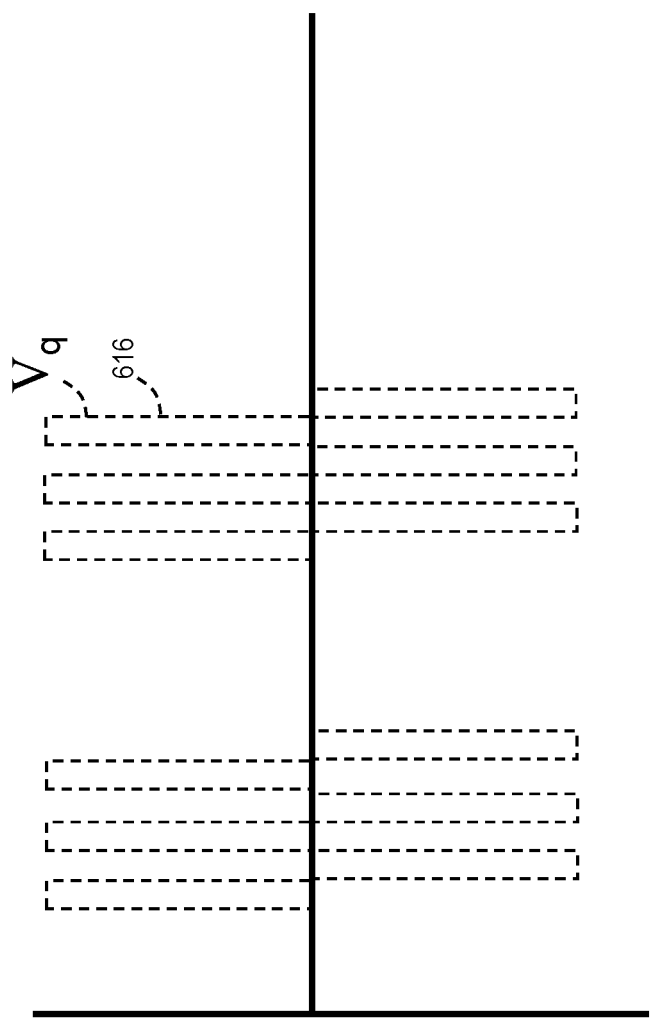

VIBRATIONAL NOTIFICATION OF MOTOR CONDITIONS IN A SELF-BALANCING ELECTRIC VEHICLE

CROSS-REFERENCES

The following applications and materials are incorporated herein, in their entireties, for all purposes: U.S. Provisional Patent Application Ser. No. 63/583,946, filed Sep. 20, 2023.

FIELD

This disclosure relates to systems and methods for rider notification in self-balancing electric vehicles.

INTRODUCTION

For various reasons relating to performance, safety, and usability, self-balancing electric vehicles may have warning-level and maximum desired motor operating parameters, relating to things such as speed, torque, current, and/or the like. Accordingly, it may be beneficial to notify a rider when the self-balancing electric vehicle approaches or exceeds such an operational threshold. Current rider notification systems include illuminators embedded in or near a board of the self-balancing electric vehicle, smartphone-based notification systems, "pushback" features that cause the board to slow down when it approaches an undesired condition such as a high speed or non-optimal battery state, and/or the like. These features help the rider avoid reaching inadvisable riding conditions, although no such notification can be effective under all conditions. Accordingly, additional notification systems may further improve performance, usability, and safety.

SUMMARY

The present disclosure provides systems, apparatuses, and methods relating to vibrational notification systems. The present disclosure describes audible/tactile notification systems that are based on vibrations produced by the electric motor of the vehicle, and therefore do not require additional hardware to be installed in the vehicle.

In some examples, a method for vibrationally notifying a rider of a self-balancing electric vehicle includes: operating a self-balancing electric vehicle; receiving, at a motor controller of a self-balancing electric vehicle, a measured value corresponding to a first parameter of the self-balancing electric vehicle; and in response to the self-balancing electric vehicle satisfying a first operational threshold value, generating a vibrational notification by applying, using the motor controller, a first pattern of vibrational impulses to a motor of the self-balancing electric vehicle.

In some examples, a vibrational notification system for a self-balancing electric vehicle includes: a motor; and a motor controller comprising a field-oriented control module including a vibration controller configured to send vibrational impulses to the motor; wherein the vibrational impulses comprise increases and decreases in a quadrature voltage applied to the motor.

In some examples, a self-balancing electric vehicle includes: a wheel having an axis of rotation; a board including a frame having an aperture to accommodate the wheel, such that the board is tiltable about the wheel, first and second deck portions of the board each configured to receive a left or right foot of a rider oriented generally perpendicular to a direction of travel of the board; an electric hub motor configured to drive the wheel; and a motor controller comprising a field-oriented control module including a vibration controller configured to send vibrational impulses to the electric hub motor; wherein the vibrational impulses comprise increases and decreases in a quadrature voltage applied to the electric hub motor.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 15 is a schematic diagram depicting a third illustrative vibration pattern suitable for notifying a rider according to aspects of the present disclosure.

DETAILED DESCRIPTION

Figure 1:
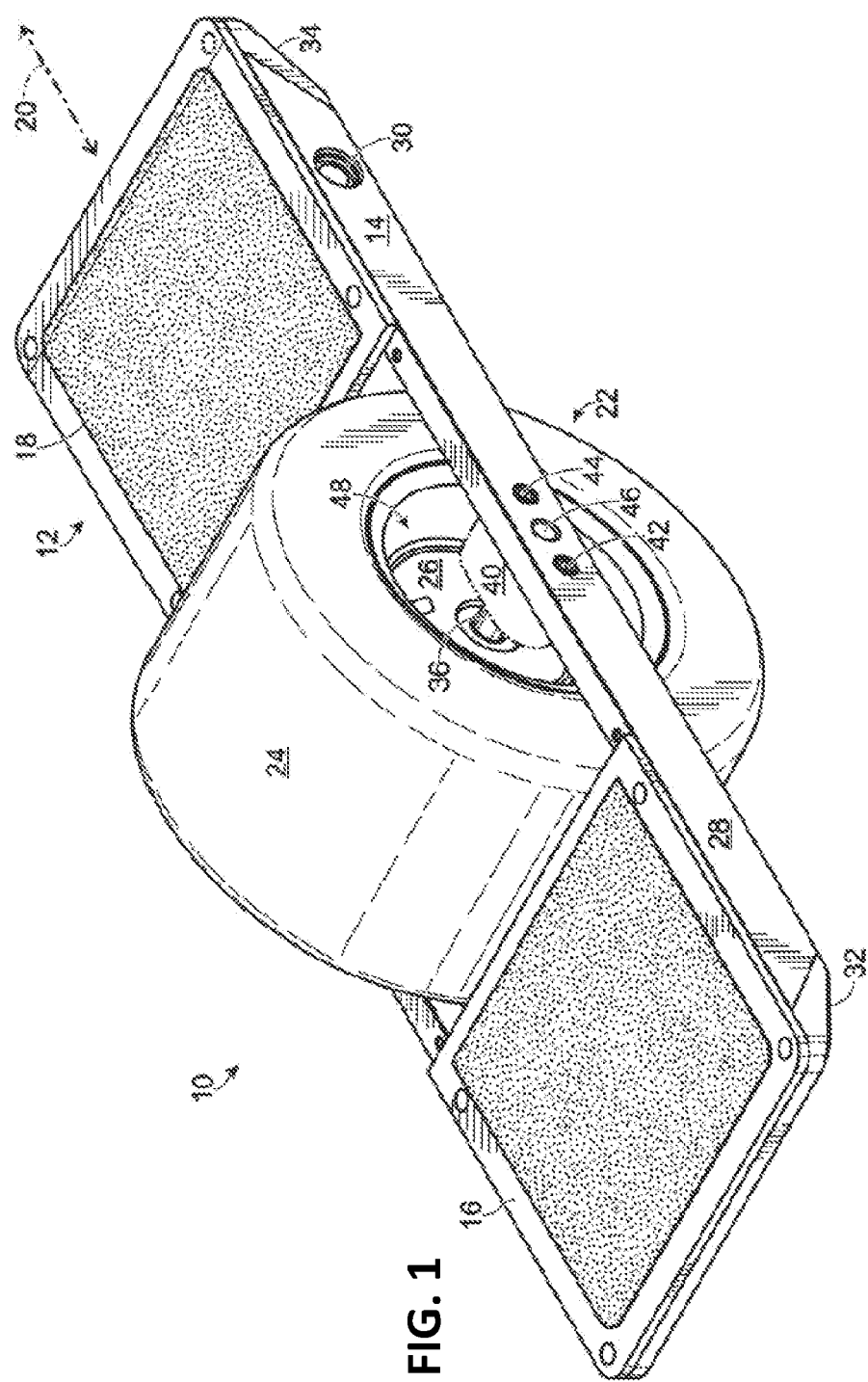
FIG. 1 is an isometric view of an illustrative one-wheeled electric vehicle suitable for use with aspects of the present disclosure.

Various aspects and examples of vibrational notification systems, as well as related methods, are described below and illustrated in the associated drawings. Unless otherwise specified, a vibrational notification system in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

The terms "inboard," "outboard," "forward," "rearward," and the like are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "rearward" means toward the rear of the vehicle. In the absence of a host vehicle, the same directional terms may be used as if the vehicle were present. For example, even when viewed in isolation, a device may have a "forward" edge, based on the fact that the device would be installed with the edge in question facing in the direction of the front portion of the host vehicle.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

Self-balancing electric vehicles may include systems configured to monitor and/or manage the health of the electric vehicle. Self-balancing electric vehicles may have defined warning and maximum desired operating parameters (AKA operational threshold values) designed to indicate when the product may be operating outside the desired or optimal range for the parameter in question. These parameters may indicate other concerns indirectly, and/or may themselves be a direct cause for concern. Parameters include items such as maximum speed threshold, torque, motor current, temperature, and/or the like. Accordingly, it may be beneficial to provide a haptic and/or audible notification to a rider when the self-balancing electric vehicle approaches or satisfies (e.g., exceeds or drops below) an operational threshold value. Similarly, it may be beneficial to provide a haptic and/or audible notification to a rider when a battery of the electric vehicle is nearly discharged, or when a hardware error has occurred, etc. These notifications may be haptic, tactile, and/or multi-modal.

The triggering and timing of such notifications may be affected by multiple variables, including rider weight, tire pressure, terrain and grade, and battery charge (e.g., percentage). For example, a heavier rider riding uphill may experience a warning notification earlier than a lighter rider on flat terrain.

Notification systems of the present disclosure provide alerts that riders can hear and feel when the vehicle is experiencing certain situations that can result in a negative outcome. In some examples, these systems are designed to work in conjunction with existing warning and safety features to help riders further recognize that the vehicle may soon violate a desired operating parameter, to give the rider time to remedy the situation (e.g., by leaning back and slowing down).

The following illustrative scenarios may lead to a haptic and/or audible notification in accordance with the present teachings:
 1. High Speed Situations: when riders reach the designated top speed in any given digital shaping setting.
 2. High Torque Situations: when riders are going up a steep hill or accelerating suddenly, beyond the desired sustainable torque for the vehicle.
 3. Low Battery or Error State: when the battery charge is below a threshold or a hardware error is experienced.

In some examples, one or more of the scenarios may be associated with a unique pattern or tone. In some examples, the notification will begin as a pulse, transitioning to a solid buzz, for example if the rider continues to accelerate.

In general, vibrational notification systems in accordance with the present teachings monitor one or more parameters of the self-balancing electric vehicle and induce vibration in a motor of the self-balancing electric vehicle when the one or more parameters approach and/or satisfy a specified threshold value. Inducing vibration in the motor may communicate both audible (i.e., buzzing) and tactile (i.e., vibration) cues to the rider. The frequency of vibration may be selected to excite mechanical resonant frequencies of the board assembly to create louder or stronger vibrations. Accordingly, vibrational notification systems in accordance with the present teachings communicate with a rider using a non-visual cue, so that the rider does not need to look at visual indicators (e.g., those incorporated within the self-balancing electric vehicle or a personal electronic device) during use.

The one or more parameters may include operating parameters, software health metrics, hardware health metrics, and/or the like. In some examples, the one or more parameters include: a measured speed of the self-balancing electric vehicle, a hardware status, a battery state of charge, a measured torque, and/or the like. In some examples, the one or more threshold values include: a maximum desired speed, a minimum desired battery charge, a maximum desired torque, and/or the like.

In some examples, the vibrational notification system induces vibration (AKA buzzing) in the motor when a measured speed of the self-balancing electric vehicle approaches a maximum speed threshold. In some examples, the motor may vibrate when the measured speed is within a specified range. In some examples, the motor may vibrate in a periodic pattern when the measured speed is within a specified range. In some examples, the motor may vibrate in a 5 Hz (or other) pattern of pulses (i.e., with five pulses per second, each of which may include a higher frequency of vibration) when the measured speed is from 90% to 99% of the maximum speed threshold. In some examples, the motor may vibrate in a 5 Hz (or other) pattern of pulses when the measured speed is from 80% to 99% of the maximum speed threshold. In some examples, a frequency of the pulses and/or the vibrations per pulse may increase as the measured speed approaches the maximum speed threshold.

In some examples, the vibrational notification system induces vibration in the motor when a measured speed of the self-balancing electric vehicle is above a maximum speed threshold. In some examples, the motor vibrates continuously when the measured speed is equal to or greater than the maximum speed threshold. In some examples, the vibrational notification system induces vibration when the measured speed is above the maximum speed threshold and ceases vibration when the measured speed is below the maximum speed threshold. In some examples, the vibrational notification system induces continuous vibration when the measured speed is above the maximum speed threshold, induces periodic vibration when the measured speed is from 80% to 99% of the maximum speed threshold, and ceases vibration when the measured speed is from 0% to 80% of the maximum speed threshold.

In some examples, the vibrational notification system induces vibration in the motor when a hardware error has occurred. In some examples the motor may vibrate in a rhythmic pattern configured to communicate a specific error code to the rider. In some examples, the motor may produce a number of vibrational pulses corresponding to the error code, followed by a pause. In some examples, the motor may vibrate in a rhythmic pattern different from the periodic pattern described above.

In some examples, the vibrational notification system induces vibration in the motor when a battery of the self-balancing electric vehicle is nearly discharged. In some examples, the motor vibrates in a rhythmic pattern configured to indicate that the battery is nearly discharged. In some examples, the motor vibrates to indicate that the battery has a charge of 5%, 10%, 15%, 20%, and/or the like. In some examples, the motor vibrates to indicate that the battery has approximately 5 minutes, 10 minutes, 15 minutes, 20 minutes, and/or the like of ride time remaining.

In some examples, the vibrational notification system induces vibration in the motor when a measured torque of the motor approaches a maximum safe torque threshold. In some examples, the motor vibrates periodically when the measured torque is from 80% to 99% of the maximum safe torque threshold. In some examples, the motor vibrates continuously when the measured torque is above the maximum safe torque threshold.

While the examples above associate specific vibration patterns with specific conditions, it is understood that any above vibration pattern may be interchangeably associated with any suitable condition. Furthermore, the vibrational notification system may utilize any suitable vibration pattern, such as periodic, continuous, rhythmic, increasing in pulse frequency, decreasing in pulse frequency, and/or the like. In addition, the frequency of vibrations within each vibrational pulse may be chosen to have any suitable value, including a single vibration or any greater number of vibrations per pulse. In some cases, the vibrational frequency may be chosen to excite one or more resonant frequencies of the board assembly, to create stronger and/or louder vibrations that will be more readily apparent to the rider.

In some examples, the vibrational notification system is configured to warn the rider that the rider is approaching an operational threshold value for informational purposes (i.e., to allow the rider to make an informed decision to slow or halt the vehicle). In some examples, the vibrational notification system is configured to warn the rider that an automatic safety measure will be engaged if the rider proceeds. Automatic safety measures may include over-voltage prevention systems, such as those described in U.S. Pat. No. 10,293,243, the entirety of which is hereby incorporated herein for all purposes; speed limiting systems; "pushback" measures; and/or the like.

In some examples, a vibrational notification system in accordance with the present teachings may utilize a version of Field Oriented Control (FOC) (also referred to as Vector Control). When the vehicle is operating, a virtual flux current (AKA direct current) is defined having a vector aligned with the rotating rotor flux angle, and a virtual quadrature current is defined at 90 degrees from the rotating rotor flux angle. Similarly, when the vehicle is operating, a virtual flux voltage is defined having a vector aligned with the rotating rotor flux angle, and a virtual quadrature voltage is defined at 90 degrees from the rotating rotor flux angle. Systems of the present disclosure induce vibrations by increasing and decreasing the virtual quadrature voltage applied to the motor. In other words, the stator voltage in the quadrature force direction is modified by the vibrational notification system to induce vibrations in the motor.

In some examples, modifying the virtual quadrature voltage includes applying a positive square wave impulse, immediately followed by a negative square wave impulse at frequencies sufficient to be perceptible by the rider, without disturbing current/torque modulation systems within the Field Oriented Control system. In some examples, modifying the virtual quadrature voltage includes applying a positive square wave impulse, immediately followed by a negative square wave impulse at about 485 Hz. In some examples, a width of the positive impulse is 313 microseconds, and a width of the negative impulse is 313 microseconds.

In some examples, a method of vibrationally notifying a rider includes: measuring a value for a specified parameter (e.g., speed, torque, etc.), comparing the measured value to a corresponding operational threshold value, and inducing vibration in the motor in response to the measured value being within a specified range.

Technical solutions are disclosed herein for vibrationally notifying the rider of a self-balancing electric vehicle. Specifically, the disclosed system/method addresses a technical problem tied to self-balancing electric vehicles and arising in the realm of self-balancing electric vehicles, namely the technical problem of how to notify a rider using non-visual methods. The system and method disclosed herein provides an improved solution to this technical problem by notifying the rider by inducing vibration within the motor.

The disclosed systems and methods provide an integrated practical application of the principles discussed herein. Specifically, the disclosed systems and methods implement the solution within a self-balancing electric vehicle. Accordingly, the disclosed systems and methods apply (or use) the relevant principles in a meaningfully limited way.

Aspects of the present vibrational notification systems may be embodied as a computer method, computer system, or computer program product. Accordingly, aspects of the present vibrational notification systems may take the form of an entirely hardware embodiment, an entirely software embodiment (including firmware, resident software, microcode, and the like), or an embodiment combining software and hardware aspects, all of which may generally be referred to herein as a "circuit," "module," or "system." Furthermore, aspects of the present vibrational notification systems may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the present vibrational notification systems may be written in one or any combination of programming languages, including an object-oriented programming language (such as Java, C++), conventional procedural programming languages (such as C), and functional programming languages (such as Haskell). Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the present vibrational notification systems may be described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be programmed into or otherwise provided to processing logic (e.g., a processor of a general purpose computer, special purpose computer, field programmable gate array (FPGA), or other programmable data processing apparatus) to produce a machine, such that the (e.g., machine-readable) instructions, which execute via the processing logic, create means for implementing the functions/acts specified in the flowchart and/or block diagram block(s).

Additionally or alternatively, these computer program instructions may be stored in a computer-readable medium that can direct processing logic and/or any other suitable device to function in a particular manner, such that the instructions stored in the computer-readable medium produce an article of manufacture including instructions which implement the function/act specified in the flowchart and/or block diagram block(s).

The computer program instructions can also be loaded onto processing logic and/or any other suitable device to cause a series of operational steps to be performed on the device to produce a computer-implemented process such that the executed instructions provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the vibrational notification systems. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of illustrative vibrational notification systems, as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Vehicle

FIG. 1 depicts an illustrative electric vehicle 10 that may be suitable for use with a vibrational notification system in accordance with aspects of the present disclosure. Other electric vehicles may also be suitable for the vibrational notification systems described herein.

Vehicle 10 is a one-wheeled, self-stabilizing skateboard substantially similar to the electric vehicles described in U.S. Pat. No. 9,101,817 (the '817 patent), the entirety of which is hereby incorporated herein for all purposes. Accordingly, vehicle 10 includes a board 12 having a frame 14 supporting a first deck portion 16 and a second deck portion 18. Each deck portion 16, 18 is configured to receive a left or right foot of a rider oriented generally perpendicular to a direction of travel of the board (see FIG. 2), the direction of travel generally indicated at 20.

Vehicle 10 also includes a wheel assembly 22. Wheel assembly 22 includes a rotatable ground-contacting element 24 (e.g., a tire, wheel, or continuous track) disposed between and extending above the first and second deck portions 16, 18, and a hub motor 26 configured to rotate ground-contacting element 24 to propel the vehicle. As shown in FIG. 1, in some examples, vehicle 10 includes exactly one ground-contacting element.

Frame 14 may include any suitable structure configured to rigidly support the deck portions and to be coupled to an axle of the wheel assembly, such that the weight of a rider may be supported on tiltable board 12 having a fulcrum at the wheel assembly axle. In some examples, frame 14 includes one or more frame members 28, on which deck portions 16 and 18 may be mounted, and which may further support additional elements and features of the vehicle, such as a charging port 30, and end bumpers 32, 34, as well as lighting assemblies, battery and electrical systems, electronics, controllers, and/or the like (see, e.g., FIGS. 4-11 and corresponding description).

Deck portions 16 and 18 may include any suitable structures configured to support the feet of a rider, such as non-skid surfaces, as well as vehicle-control features, such as a rider detection system. In some examples, a rider detection system includes a strain gauge rider detection system. Illustrative deck portions, including other suitable rider detection systems, are described in the '817 patent, as well as in U.S. patent application Ser. No. 14/934,024, the entirety of which is hereby included herein for all purposes.

A shaft 36 of an axle portion of hub motor 26 is coupled to frame 14, as shown in FIG. 1. For example, the shaft may be directly attached to frame 14, or may be coupled to the frame through a connection or mounting block 40 (also referred to as an axle mount). In some examples, shaft 36 is bolted or otherwise affixed to mounting block 40, which in turn may be bolted or affixed to frame 14 (e.g., by bolts 42, 44). In some examples, a through hole 46 is provided in frame 14 for access to the connector of shaft 36 to block 40.

Figure 2:
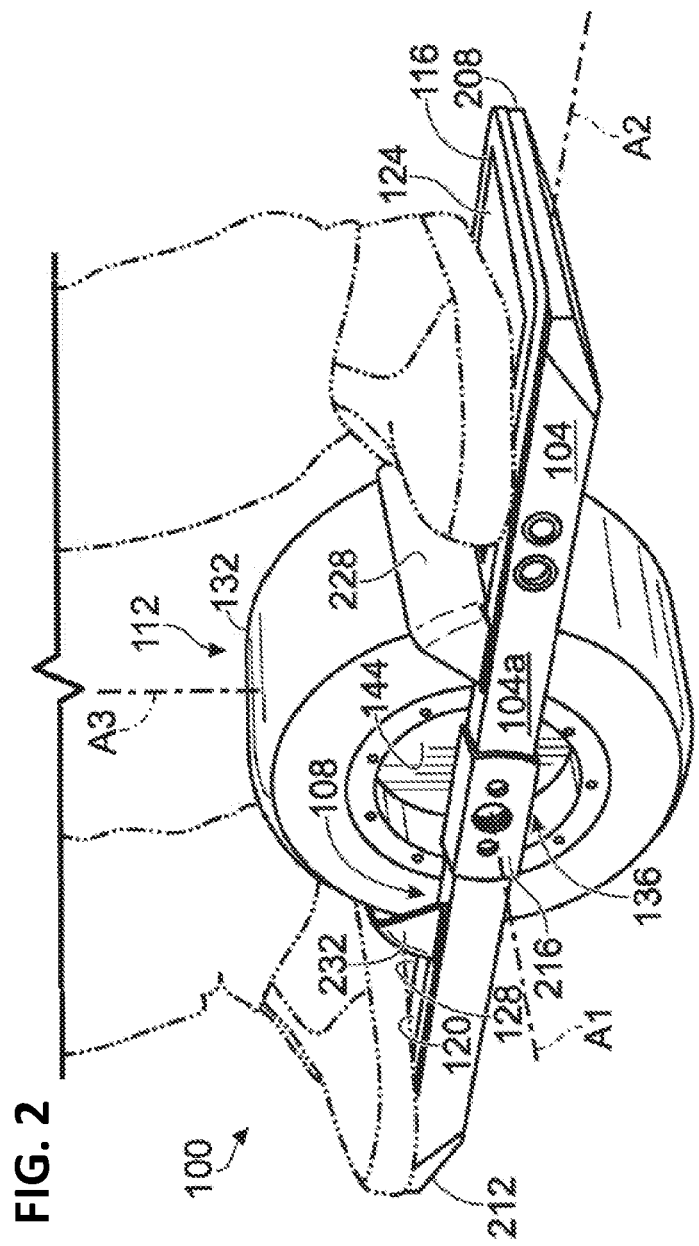
FIG. 2 is an isometric view of another illustrative one-wheeled electric vehicle showing a rider mounted thereon.
Figure 3:
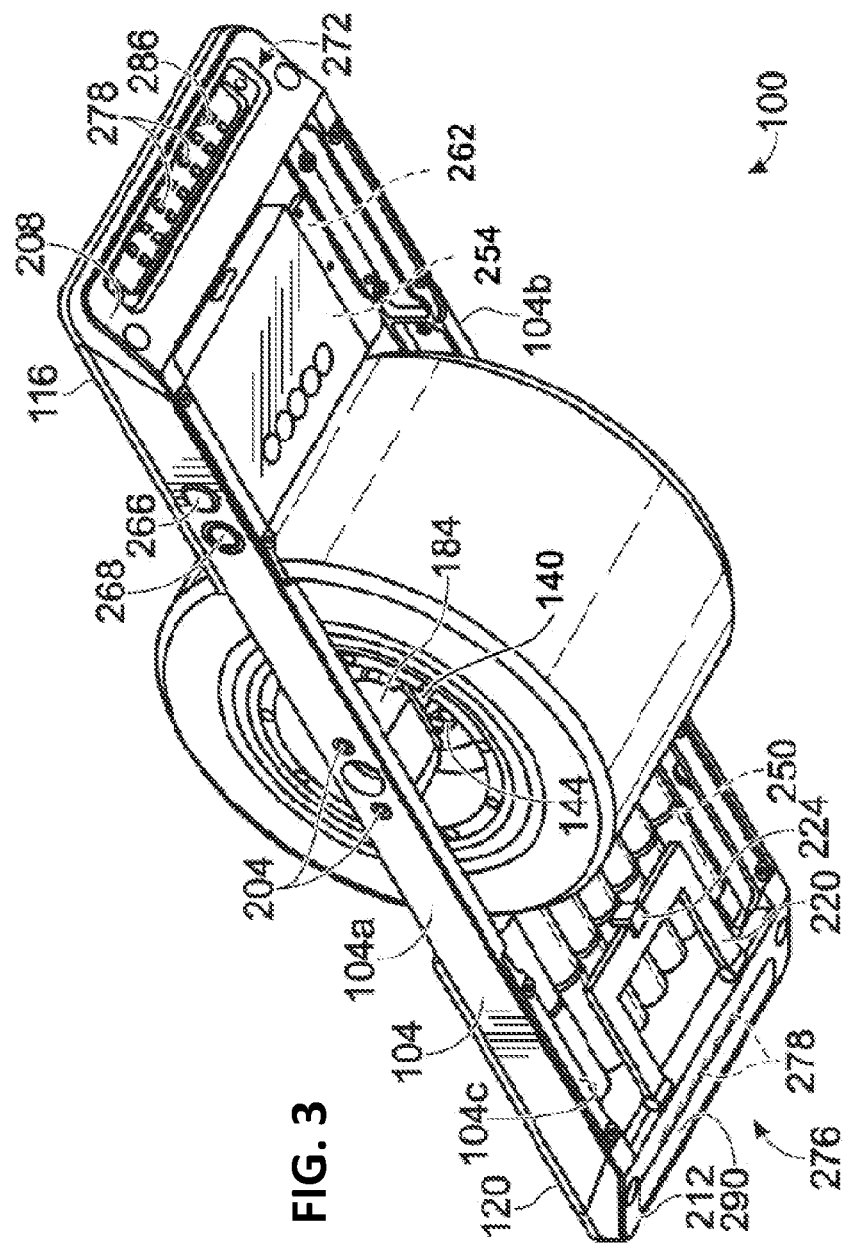
FIG. 3 is a bottom oblique isometric view of the vehicle of FIG. 2.

FIGS. 2-3 depict another example of a self-balancing electric vehicle substantially similar to vehicle 10, indicated at 100. Vehicle 100 includes a board (or foot deck, or frame, or platform) 104 having an opening 108 for receiving a wheel assembly 112 between first and second deck portions (or footpads) 116, 120. First and second deck portions 116, 120 may be of the same physical piece, or may be separate pieces. First and second deck portions 116, 120 may be included in board 104. First and second deck portions 116, 120 are each configured to support a rider's foot. For example, first and second deck portions 116, 120 may each be configured to receive a left or a right foot of the rider.

In some examples, board/frame 104 defines a plane. First deck portion 116 is mounted to frame 104 and configured to support a first foot of the rider. Second deck portion 120 is mounted to frame 104 and configured to support a second foot of the rider.

Wheel assembly 112 is disposed between first and second deck portions 116, 120. In some examples, first and second deck portions 116, 120 are located on opposite sides of wheel assembly 112 with board 104 being dimensioned to approximate a skateboard.

In other examples, the board approximates a longboard skateboard, snowboard, surfboard, and/or is otherwise desirably dimensioned. In some examples, deck portions 116, 120 of board 104 are covered with non-slip material portions 124, 128 (e.g., 'grip tape') to aid in rider control.

Wheel assembly 112 includes a ground-contacting element (e.g., a tire, wheel, or continuous track) 132. As shown, vehicle 100 includes exactly one ground-contacting element 132, and the exactly one ground-contacting element is disposed between first and second deck portions 116, 120. Ground-contacting element 132 is coupled to a motor assembly 136. Motor assembly 136 is mounted to board 104. Motor assembly 136 includes an axle 140, which is coupled to board 104 by one or more axle mounts and one or more fasteners, such as a plurality of bolts. In some examples, motor assembly 136 is configured to rotate ground-contacting element 132 around (or about) axle 140 to propel vehicle 100. For example, motor assembly 136 may include an electric motor, such as a hub motor 144, configured to rotate ground-contacting element 132 about axle 140 to propel vehicle 100 along the ground.

Vehicle 100 has a pitch axis A1, a roll axis A2, and a yaw axis A3 (see FIG. 2). Pitch axis A1 is the axis about which tire 132 is rotated by motor assembly 136. For example, pitch axis A1 may pass through axle 140 (e.g., pitch axis A1 may be parallel to and aligned with an elongate direction of axle 140). Roll axis A2 is perpendicular to pitch axis A1, and may substantially extend in a direction in which vehicle 100 may be propelled by motor assembly 136. For example, roll axis A2 may extend in an elongate direction of board 104. Yaw axis A3 is perpendicular to pitch axis A1 and to roll axis A2. For example, yaw axis A3 may be normal to a plane defined by deck portions 116, 120, as shown in FIG. 2.

In some examples, wheel 132 is mounted to frame 104 between deck portions 116, 120, and extends above and below the plane defined by frame 104. In some examples, wheel 132 is configured to rotate about an axis (e.g., pitch axis A1) lying in the plane. In addition, roll axis A2 may lie in the plane defined by frame 104. In some examples, the pitch and roll axes define the plane.

In some examples, tire 132 is wide enough in a heel-toe direction (e.g., in a direction parallel to pitch axis A1), so that the rider can balance in the heel-toe direction using his or her own balance. Tire 132 may be tubeless, or may be used with an inner tube. Tire 132 may be a non-pneumatic tire. For example, tire 132 may be "airless", solid, and/or made of foam. In some examples, tire 132 has a profile such that the rider can lean vehicle 100 over an edge of tire 132 (and/or pivot the board about roll axis A2 and/or yaw axis A3) through heel and/or toe pressure to corner vehicle 100.

In some examples, hub motor 144 is mounted within tire (or wheel) 132 and may be internally geared or may be direct-drive. The use of a hub motor may eliminate chains and belts, and may enable a form factor that considerably improves maneuverability, weight distribution, and aesthetics. Mounting tire 132 onto hub motor 144 may be accomplished by either a split-rim design that may use hub adapters, which may be bolted on to hub motor 144, or by casting a housing of the hub motor such that it provides mounting flanges for a tire bead directly on the housing of the hub motor.

With continuing reference to FIGS. 2-3, a first skid pad 208 may be integrated into (or connected to) a first end of board 104 proximal first deck portion 116, and a second skid pad 212 may be integrated into (or connected to) a second end of board 104 proximal second deck portion 120. In some examples, skid pads 208, 212 are replaceable and/or selectively removable. For example, the skid pads may include replaceable polymer parts or components. In some examples, the skid pads are configured to allow the rider to bring vehicle 100 to a stop in an angled orientation (e.g., by setting one end of the board against the ground after the rider removes their foot from a rider detection device or switch, which is described below in further detail). The respective skid pad may be worn by abrasion with the surface of the ground as that end of the board is set against (or brought into contact with) the ground.

In some examples, vehicle 100 includes one or more side-skid pads configured to protect the paint or other finish on board 104, and/or otherwise protect vehicle 100 if, for example, vehicle 100 is flipped on its side and/or slides along the ground on its side. For example, the one or more side-skid pads may be removably connected to one or more opposing longitudinal sides of the board (e.g., extending substantially parallel to the roll axis). FIG. 2 shows a first side-skid pad 216 connected to a first longitudinal side 104a of board 104. In FIG. 3, side-skid pad 216 has been removed from first longitudinal side 104a. A second side-skid pad (not shown) may be similarly removably connected to a second longitudinal side 104b (see FIG. 3) of board 104 opposite first longitudinal side 104a. The side-skid pads may be incorporated into the electric vehicle as one or more removable parts or components, and/or may be or include replaceable polymer parts or components.

A removable connection of the skid pads and/or the side-skid pads to the board may enable the rider (or other user) to selectively remove one or more of these pads that become worn with abrasion, and/or replace the worn pad(s) with one or more replacement pads.

As shown in FIG. 3, vehicle 100 may include a handle 220. Handle 220 may be disposed on an underside 104c of board 104. In some examples, handle 220 is integrated into a housing or enclosure of one or more of the electrical components.

In some examples, handle 220 is operable between IN and OUT positions. For example, handle 220 may be pivotally connected to board 104, with the IN position corresponding to handle 220 substantially flush with underside 104c of board 104, and the OUT position corresponding to handle 220 pivoted (or folded) away from underside 104c such that handle 220 projects away from deck portion 120.

Vehicle 100 may include any suitable apparatus, device, mechanism, and/or structure for preventing water, dirt, or other road debris from being transferred by the ground-contacting element to the rider. For example, as shown in FIG. 2, vehicle 100 may include first and second partial fender portions 228, 232. Portion 228 is shown coupled to first deck portion 116, and portion 232 is shown coupled to second deck portion 120. Portion 228 may prevent debris from being transferred from tire 132 to a portion of the rider positioned on or adjacent deck portion 116, such as when tire 132 is rotated about pitch axis A1 in a counter-clockwise direction. Portion 232 may prevent debris from being transferred from tire 132 to a portion of the rider positioned on or adjacent deck portion 120, such as when tire 132 is rotated about pitch axis A1 in a clockwise direction. Additionally and/or alternatively, vehicle 100 may include a full fender (not shown). A full fender may be configured to prevent a transfer of debris from the ground-contacting element to the rider. In some examples, a full fender and/or fender portions 228, 232 are attached to at least one of deck portions 116, 120 and configured to prevent water traversed by wheel 132 from splashing onto the rider. In some examples, a suitable fender is attached to one or both of deck portions 116, 120, and substantially entirely separates wheel 132 from the rider.

In some examples, fenders 228, 232, and/or a full fender include a resilient fender. For example, fenders may include (or be) a sheet of substantially flexible or resilient material, such as plastic. In some examples, a first side of the resilient material is coupled to deck portion 116 (or board 104 proximate deck portion 116), and a second side of the resilient material is coupled to deck portion 120 (or board 104 proximate deck portion 120).

As indicated in FIG. 3, the one or more electrical components of vehicle 100 may include a power supply 250, a motor controller 254, a rider detection device 262, a power switch 266, and a charge plug 268. In some examples, power supply 250 includes one or more batteries (e.g., rechargeable batteries) which may be re-chargeable, such as one or more lithium batteries. In some examples, power supply 250 includes one or more lithium iron phosphate batteries, one or more lithium polymer batteries, one or more lithium cobalt batteries, one or more lithium manganese batteries, and/or a combination thereof. For example, power supply 250 may include sixteen (16) A123 lithium iron phosphate batteries (e.g., size 26650). The batteries of power supply 250 may be arranged in a 16S1P configuration. In some examples, a microcontroller 269 and/or one or more sensors (or at least one sensor) 270 are included in or connected to motor controller 254 (see FIG. 4). In some examples, at least one of sensors 270 is configured to measure orientation information (or an orientation) of board 104. For example, sensors 270 may be configured to sense movement of board 104 about and/or along the pitch, roll, and/or yaw axes. In some examples, the motor is configured to cause rotation of wheel 132 based on the orientation of board 104. In particular, motor controller 254 may be configured to receive orientation information measured by the at least one sensor of sensors 270 and to cause motor assembly 254 to propel the electric vehicle based on the orientation information. For example, motor controller 254 may be configured to drive hub motor 144 based on received sensed movement of board 104 from sensors 270 via microcontroller 269 to propel and/or actively balance vehicle 100.

In some examples, one or more of the electrical components is integrated into board 104. For example, board 104 may include a first environmental enclosure that may house power supply 250, and a second environmental enclosure that may house motor controller 254, and rider detection device 262. The environmental enclosures may protect the one or more electrical components from being damaged, such as by water ingress.

In some examples, vehicle 100 includes one or more light assemblies, such as one or more headlight and/or taillight assemblies. For example, a first headlight/taillight assembly (or first light assembly) 272 may be disposed on or at (and/or connected to) a first end portion of board 104 (e.g., at a distal end portion of first deck portion 116), and a second headlight/taillight assembly 276 may be disposed on or at (and/or connected to) a second end portion of board 104 (e.g., at a distal end portion of second deck portion 120). In some examples, the second end portion of board 104 is opposite the first end portion.

In some examples, headlight/taillight assemblies 272, 276 are configured to reversibly light vehicle 100. For example, assemblies 272, 276 may indicate the direction that vehicle 100 is moving by changing color. For example, the headlight/taillight assemblies may each include one or more red and white LEDs (or other suitable one or more illuminators) 278 configured to receive data from microcontroller 269 (and/or a pitch sensor or sensors 270, such as a 3-axis gyro 280—see FIG. 4) and automatically change color from red to white (or white to red, or a first color to a second color) based on the direction of movement of vehicle 100, with white LEDs (or a first color) shining in the direction of motion and red LEDs (or a second color) shining backward (e.g., opposite the direction of motion). For example, one or more of the headlight/taillight assemblies (e.g., their respective illuminators) may be connected to microcontroller 269 via an LED driver, which may be included in or coupled to motor controller 254. In some examples, the illuminators include RGB/RGBW (red-green-blue/red-green-blue-white) LEDs.

In some examples, illuminators 278 are located in and/or protected by skid pads 208, 212, as shown in FIG. 3. For example, skid pads 208, 212 may include respective apertures 286, 290. Illuminators 278 may be disposed in and shine through respective apertures 286, 290. Apertures 286, 290 may be dimensioned to prevent illuminators 278 from contacting the ground. For example, apertures 286, 290 may each have a depth that is greater than a height of illuminators 278. In some examples, the illuminators may be separable from the associated skid pad, so that the skid pads may be removed without removing the illuminators.

As shown in FIG. 3, first skid pad 208 and a first illuminator 278 are disposed at a distal end of first deck portion 116, and second skid pad 212 and a second illuminator 278 are disposed at a distal end of second deck portion 120. Each of skid pads may include an aperture (e.g., skid pad 208 may include aperture 286, and skid pad 212 may include aperture 290, as mentioned above) configured to allow light from the corresponding illuminator to shine through while preventing the illuminator from contacting the ground.

B. Illustrative Control System

Figure 4:
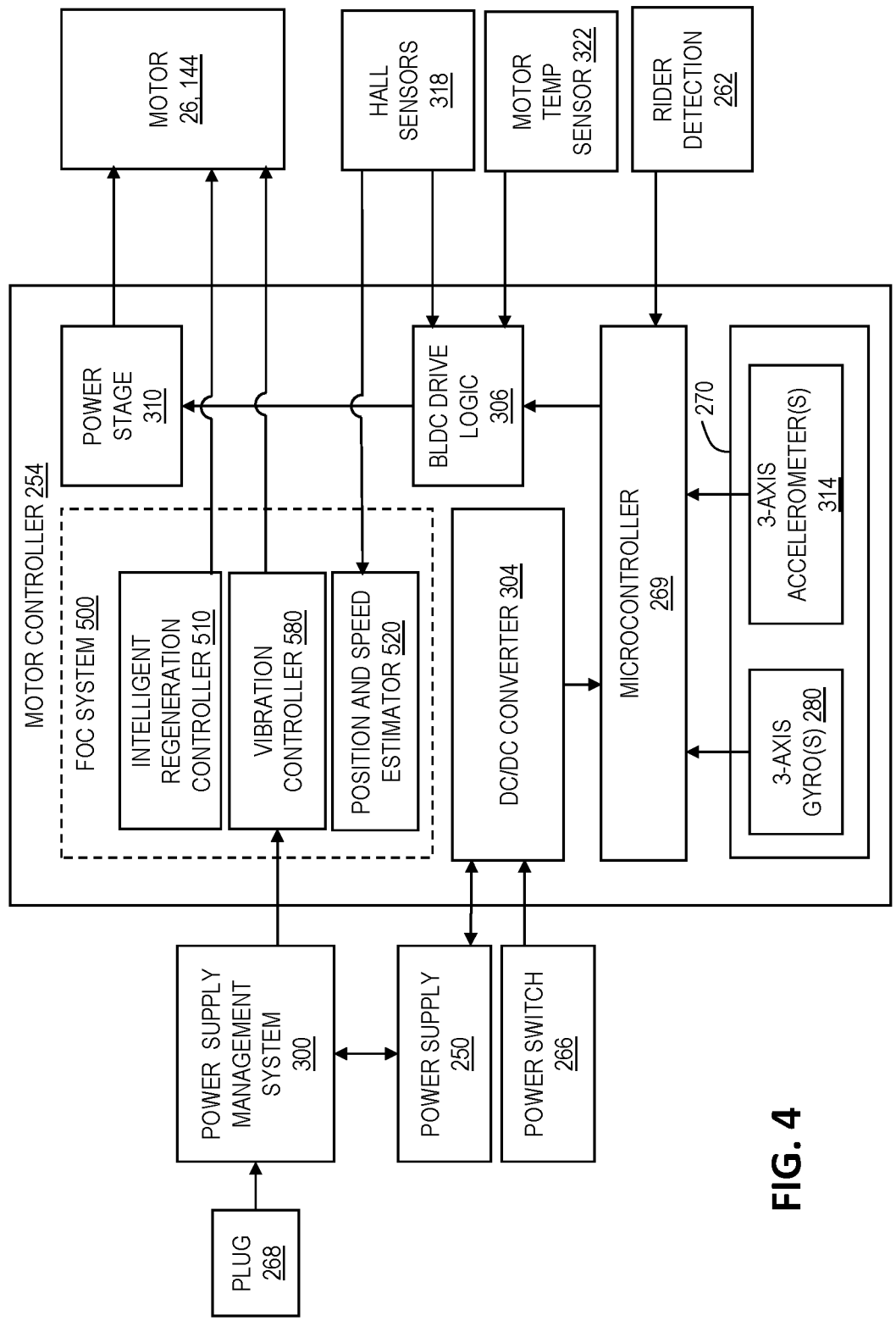
FIG. 4 is a schematic diagram of illustrative electrical controls of the vehicles of FIGS. 1-3.

FIG. 4 shows a block diagram of various illustrative electrical components of vehicle 10 (or 100), including onboard controls, some or all of which may be included in vehicle 10 (or 100). The electrical components may include a power supply management system 300, a direct current to direct current (DC/DC) converter 304, a brushless direct current (BLDC) drive logic 306, a power stage 310, one or more 3-axis accelerometer 314, one or more Hall sensors 318, and/or a motor temperature sensor 322. DC/DC converter 304, BLDC drive logic 306, and power stage 310 may be included in and/or coupled to motor controller 254. In some examples, motor controller 254 comprises a variable-frequency drive and/or any other suitable drive. In some examples, accelerometer(s) 314 are included in sensors 270.

Active balancing (or self-stabilization) of the electric vehicle may be achieved through the use of a feedback control loop or mechanism. The feedback control mechanism may include sensors 270, which may be electrically coupled to and/or included in motor controller 254. Preferably, the feedback control mechanism includes a Proportional-Integral-Derivative (PID) control scheme using one or more gyros (e.g., gyro(s) 280) and one or more accelerometers (e.g., accelerometer(s) 314). Gyro 280 may be configured to measure a pivoting of the foot deck about its pitch axis. Gyro 280 and accelerometer 314 may be collectively configured to estimate (or measure, or sense) a lean angle of board 104, such as an orientation of the foot deck about the pitch, roll and/or yaw axes. In some examples, the gyro and accelerometer 314 may be collectively configured to sense orientation information sufficient to estimate the lean angle of frame 104 (or 14) including pivotation about the pitch, roll and/or yaw axes.

As mentioned above, orientation information of board 104 may be measured (or sensed) by gyro 280 and accelerometer 314. The respective measurements (or sense signals) from gyro 280 and accelerometer 314 may be combined using a complementary or Kalman filter to estimate a lean angle of board 104 (e.g., pivoting of board 104 about the pitch, roll, and/or yaw axes, with pivoting about the pitch axis corresponding to a pitch angle (about axle 140 or 36), pivoting about the roll axis corresponding to a roll or heel-toe angle, and pivoting about the yaw axis corresponding to a side-to-side yaw angle) while filtering out the impacts of bumps, road texture and disturbances due to steering inputs. For example, gyro 280 and accelerometer 314 may be connected to microcontroller 269, which may be configured to correspondingly measure movement of board 104 about and along the pitch, roll, and/or yaw axes.

Alternatively, the electronic vehicle may include any suitable sensor and feedback control loop configured to self-stabilize a vehicle, such as a 1-axis gyro configured to measure pivotation of the board about the pitch axis, a 1-axis accelerometer configured to measure a gravity vector, and/or any other suitable feedback control loop, such as a closed-loop transfer function. Additional accelerometer and gyro axes may allow improved performance and functionality, such as detecting if the board has rolled over on its side or if the rider is making a turn.

In some examples, the feedback control loop is configured to drive motor 26, 144 to reduce an angle of board 12, 104 with respect to the ground. For example, if a rider were to angle board 12 downward, so that first deck portion 16 was 'lower' than second deck portion 18 (e.g., if the rider pivoted board 12 counterclockwise (CCW) about axle 36 in FIG. 1), then the feedback loop may drive motor 26 to cause CCW rotation of tire 24 about the pitch axis (i.e., axle 36) and a clockwise force on board 12.

Thus, motion of the electric vehicle may be achieved by the rider leaning his or her weight toward a selected (e.g., "front") foot. Similarly, deceleration may be achieved by the rider leaning toward the other (e.g., "back") foot. Regenerative braking can be utilized to slow the vehicle, as discussed further below. Sustained operation may be achieved in either direction by the rider maintaining their lean toward either selected foot.

As indicated in FIG. 4, in some examples, microcontroller 269 is configured to send a signal to brushless DC (BLDC) drive logic 306, which may communicate information relating to the orientation and motion of board 104. In some examples, BLDC drive logic 306 may then interpret the signal and communicate with power stage 310 to drive motor 144 accordingly. In some examples, Hall sensors 318 send a signal to the BLDC drive logic to provide feedback regarding a substantially instantaneous rotational rate of the rotor of motor 144. In some examples, motor temperature sensor 322 is configured to measure a temperature of motor 144 and send this measured temperature to logic 306. In some examples, logic 306 limits an amount of power supplied to motor 144 based on the measured temperature of motor 144 to prevent the motor from overheating.

Certain modifications to the PID loop or other suitable feedback control loop may be incorporated to improve performance and safety of the electric vehicle. For example, integral windup may be prevented by limiting a maximum integrator value, and an exponential function may be applied to a pitch error angle (e.g., a measured or estimated pitch angle of board 104).

Additionally or alternatively, some examples may include neural network control, fuzzy control, genetic algorithm control, linear-quadratic regulator control, state-dependent Riccati equation control, and/or other control algorithms. In some examples, absolute or relative encoders may be incorporated to provide feedback on motor position.

Figure 5:
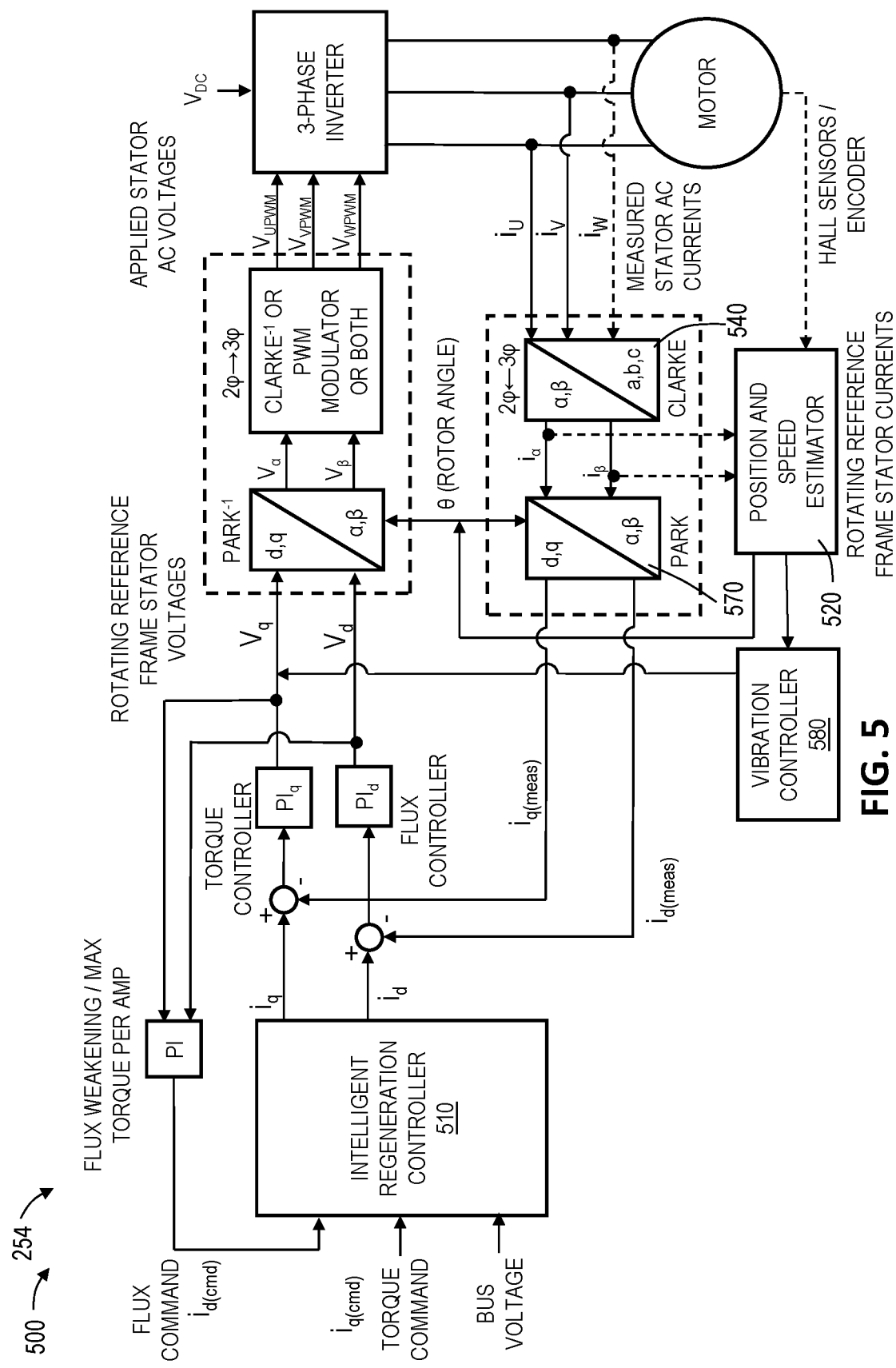
FIG. 5 is a schematic diagram of an illustrative Field Oriented Control (FOC) system in accordance with aspects of the present disclosure.

In some examples, a field-oriented control (FOC) or vector control system 500 is incorporated into the motor controller (e.g., in microcontroller 269, drive logic 306, and/or any other suitable processing logic of the motor controller). A suitable FOC system is depicted in FIG. 5. As described below with respect to FIGS. 5-12, this FOC system may be configured to cause the motor to vibrate, acting as a notification system for the rider. In some examples, this FOC system incorporates a vibration controller 580, which is configured to evaluate parameters such as speed, torque, battery health, and/or the like, and apply an appropriate vibration pattern. In some examples, vibration controller 580 is configured to receive a rotational rate of the rotor from Hall sensors 318, which is then utilized by the vibration controller to calculate a speed of the self-balancing electric vehicle.

As mentioned above, during turning, the pitch angle can be modulated by the heel-toe angle (e.g., pivoting of the board about the roll axis), which may improve performance and prevent a front inside edge of board 104 from touching the ground. In some examples, the feedback loop is configured to increase, decrease, or otherwise modulate the rotational rate of the tire if the board is pivoted about the roll and/or yaw axes. This modulation of the rotational rate of the tire may exert an increased normal force between a portion of the board and the rider, and may provide the rider with a sense of "carving" when turning, similar to the feel of carving a snowboard through snow or a surfboard through water.

In some examples, once the rider has suitably positioned themselves on the board, the control loop is configured to not activate until the rider moves the board to a predetermined orientation. For example, an algorithm may be incorporated into the feedback control loop, such that the control loop is not active (e.g., does not drive the motor) until the rider uses their weight to bring the board up to an approximately level orientation (e.g., 0 degree pitch angle). Once this predetermined orientation is detected, the feedback control loop may be enabled (or activated) to balance the electric vehicle and to facilitate a transition of the electric vehicle from a stationary mode (or configuration, or state, or orientation) to a moving mode (or configuration, or state, or orientation).

With continued reference to FIG. 4, the various electrical components may be configured to manage power supply 250. For example, power supply management system 300 may be a battery management system configured to protect batteries of power supply 250 from being overcharged, over-discharged, and/or short-circuited. System 300 may monitor battery health, may monitor a state of charge in power supply 250, and/or may increase the safety of the vehicle. In some examples, power supply management system 300 is connected between a charge plug 268 of vehicle 10 and power supply 250. The rider (or other user) may couple a charger to plug 268 and re-charge power supply 250 via system 300. In these examples, power supply management system 300 may communicate battery health, state of charge, and/or the like to vibration controller 580.

In operation, power switch 266 may be activated (e.g., by the rider). In some examples, activation of switch 266 sends a power-on signal to converter 304. In response to the power-on signal, converter 304 may convert direct current from a first voltage level provided by power supply 250 to one or more other voltage levels. In some examples, the other voltage levels are different from the first voltage level. In some examples, converter 304 is connected to the other electrical components via one or more electrical connections to provide these electrical components with suitable voltages.

In some examples, converter 304 (or other suitable circuitry) transmits the power-on signal to microcontroller 269. In response to the power-on signal, microcontroller 269 may initialize sensors 270 and rider detection device 262.

The electric vehicle may include one or more safety mechanisms, such as power switch 266 and/or rider detection device 262 to ensure that the rider is on the board before engaging the feedback control loop. In some examples, rider detection device 262 is configured to determine if the rider's feet are disposed on the foot deck, and to send a signal causing motor 144 to enter an active state when the rider's feet are determined to be disposed on the foot deck.

Rider detection device 262 may include any suitable mechanism, structure, or apparatus for determining whether the rider is on the electric vehicle. For example, device 262 may include one or more mechanical buttons, one or more capacitive sensors, one or more inductive sensors, one or more optical switches, one or more force-resistive sensors, and/or one or more strain gauges. Rider detection device 262 may be located on or under either or both of first and second deck portions 16, 18 or 116, 120 (see FIGS. 1-2). In some examples, the one or more mechanical buttons or other devices are pressed directly (e.g., if on the deck portions), or indirectly (e.g., if under the deck portions), to sense whether the rider is on board 104. In some examples, the one or more capacitive sensors and/or the one or more inductive sensors are located on or near a surface of either or both of the deck portions, and may correspondingly detect whether the rider is on the board via a change in capacitance or a change in inductance. In some examples, the one or more optical switches are located on or near the surface of either or both of the deck portions. The one or more optical switches may detect whether the rider is on the board based on an optical signal. In some examples, the one or more strain gauges are configured to measure board or axle flex imparted by the rider's feet to detect whether the rider is on the board. In some examples, device 262 includes a hand-held "deadman" switch.

In some examples, if device 262 detects that the rider is suitably positioned on the electric vehicle, then device 262 sends a rider-present signal to microcontroller 269. In some examples, the rider-present signal is the signal causing motor 26, 144 to enter the active state. In response to the rider-present signal (and/or the board being moved to the level orientation), microcontroller 269 may activate the feedback control loop for driving motor 144. For example, in response to the rider-present signal, microcontroller 269 may send board orientation information (or measurement data) from sensors 270 to logic 306 for powering motor 26, 144 via power stage 310.

In some examples, if device 262 detects that the rider is no longer suitably positioned or present on the electric vehicle, device 262 may send a rider-not-present signal to microcontroller 269. In response to the rider-not-present signal, circuitry of vehicle 10 (e.g., microcontroller 269, logic 306, and/or power stage 310) may be configured to reduce a rotational rate of the rotor relative to the stator to bring vehicle 10 to a stop. For example, the electric coils of the rotor may be selectively powered to reduce the rotational rate of the rotor. In some examples, in response to the rider-not-present signal, the circuitry is configured to energize the electric coils with a relatively strong and/or substantially continuously constant voltage, to lock the rotor relative to the stator, to prevent the rotor from rotating relative to the stator, and/or to bring the rotor to a sudden stop.

In some examples, the vehicle is configured to actively drive motor 26, 144 even though the rider may not be present on the vehicle (e.g., temporarily), which may allow the rider to perform various tricks. For example, device 262 may be configured to delay sending the rider-not-present signal to the microcontroller for a predetermined duration of time, and/or the microcontroller may be configured to delay sending the signal to logic 306 to cut power to the motor for a predetermined duration of time.

C. Illustrative Field Oriented Control System

FIGS. 5-13 relate to a field-oriented control (FOC) system and algorithm configured to manage stator voltages to run a brushless DC (BLDC) motor of a vehicle, such as vehicles 10, 100 described in Section A. The FOC system described below may be part of or coupled to a motor controller, such as motor controller 254 described in Section B.

In general, FOC is utilized to ensure maximum torque is applied for a given amount of current, by maximizing the net current vector in a direction 90-degrees with respect to the rotor flux. This is accomplished by controlling two orthogonal component vectors: a direct current ($i_d$) pointed along the rotor flux axis and a quadrature current ($i_q$) pointed 90 degrees from the direct current vector. As mentioned above, the direct current may be referred to as the flux current. The orientations of the vectors mean that maximizing the quadrature current and minimizing the direct current would cause the most efficient overall net current vector (i.e., at 90 degrees from the rotor flux).

FIG. 5 is a block diagram of an illustrative FOC system 500 (also referred to as a FOC scheme or FOC platform) suitable for use with aspects of the present disclosure. FIGS. 6-11 depict the various vector current frameworks discussed below.

Figure 7:
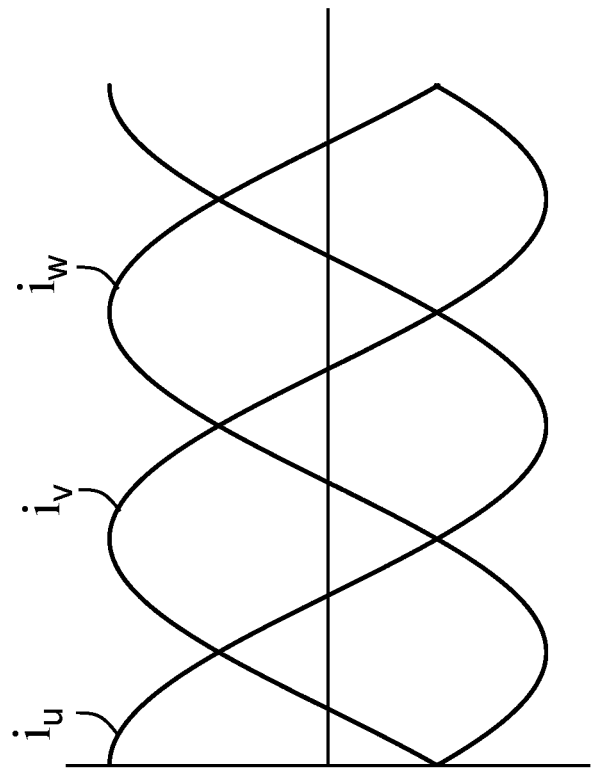
FIG. 7 is a schematic diagram depicting the variation over time of three illustrative currents associated with the reference system of FIG. 6.
Figure 6:
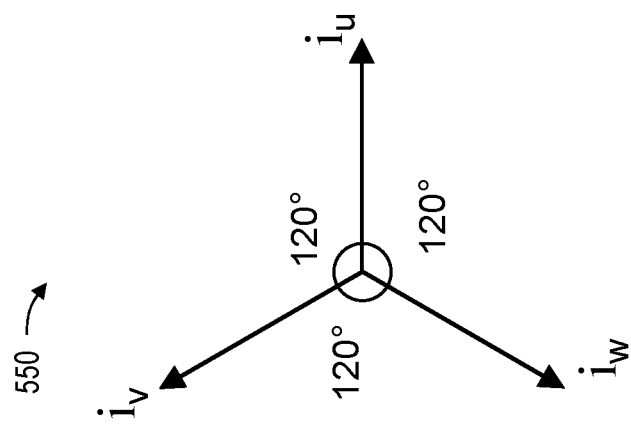
FIG. 6 is a schematic diagram depicting an illustrative three-axis reference system used by the FOC system of FIG. 5.

With reference to FIGS. 5 and 6-7, each of the three phase currents of the motor may be controlled by controlling applied stator voltages, namely $V_U$, $V_V$, and $V_W$. To this end, stator currents ($i_U$, $i_V$, and $i_W$) are measured, usually by measuring two of the currents and calculating the third. These three currents comprise vectors that can be added together to determine the resulting net current vector. Controlling the three currents therefore controls the net current vector, and a relationship between the net current vector and the rotor flux vector determines how much torque is experienced by the rotor. Specifically, maximum motor torque is achieved when the net stator current vector is ninety degrees from the rotor flux.

Figure 9:
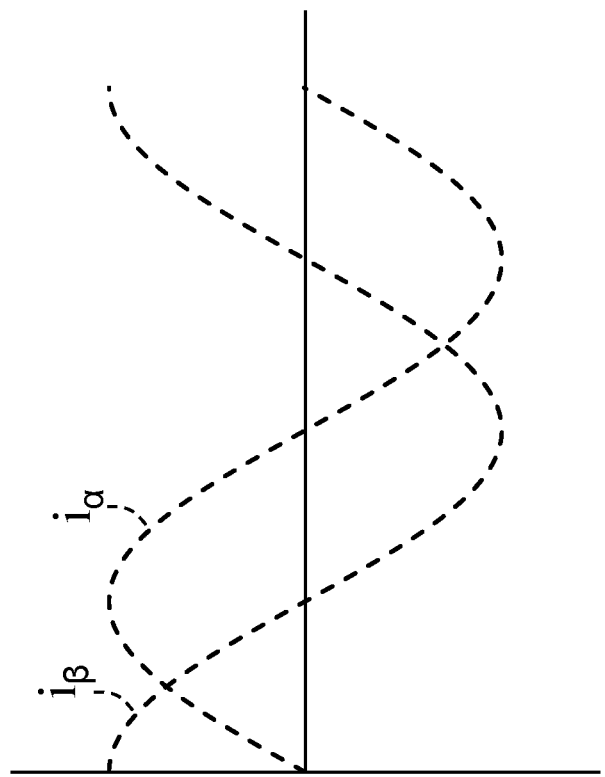
FIG. 9 is a schematic diagram depicting the variation with time of two illustrative currents associated with the reference system of FIG. 8.
Figure 8:
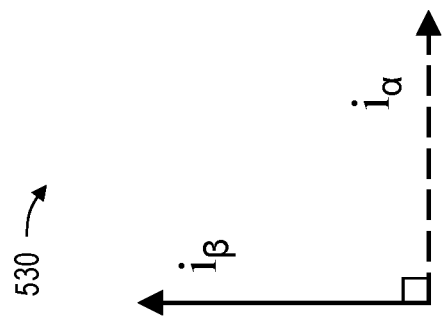
FIG. 8 is a schematic diagram depicting an illustrative two-axis reference system used by the FOC system of FIG. 5.

Controllers of this type are generally configured to maintain the net current vector at 90 degrees from the rotor flux, and to control the amount of motor torque by regulating the amplitude of the net current vector. Accordingly, the controller (e.g., a position and speed estimator module 520) measures the rotor position (e.g., using Hall sensors, an encoder, a resolver, a sensorless approach, etc.), which determines the rotor flux position, and then the controller adjusts the net current vector to be pointed 90 degrees from the rotor flux position. Rather than directly determining which values of the three stator voltages to apply, which is complex and requires additional components, system 500 first simplifies the net current vector by mathematically converting it to a two-axis framework 530 (see FIG. 8) (axes α and β) using the Clarke Transformation 540 (known in the art and also referred to as the Forward Clarke transformation). This transformation results in expression of the net current vector as its two components in the α, β reference frame: Ia and is (see FIG. 9). These component vectors could theoretically be utilized to determine the desired $V_\alpha$ and $V_\beta$, which may be converted back to a three-axis system (e.g., three-axis system 550, depicted in FIG. 6) to drive the motor. However, further simplification is possible and desired, because the α and β axes form a stationary frame of reference while the net current vector is rotating through space. That means ia and is vary over time (e.g., sinusoidally), as shown in FIG. 9.

Figure 11:
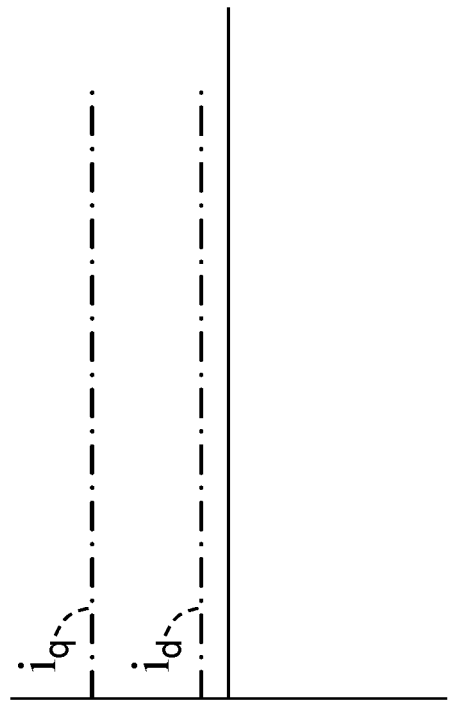
FIG. 11 is a schematic diagram depicting the variation with time of two illustrative currents associated with the reference system of FIG. 10.
Figure 10:
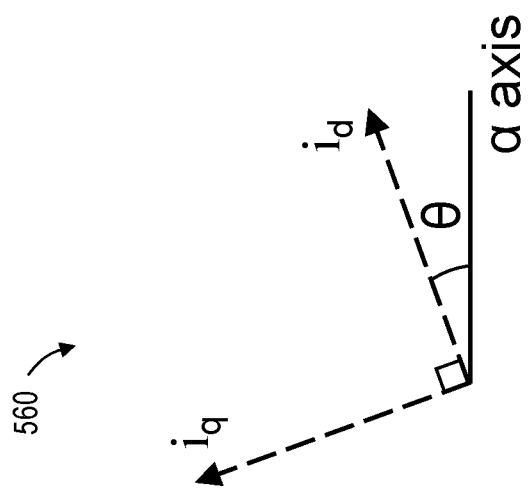
FIG. 10 is a schematic diagram depicting an illustrative rotating two-axis reference system used by the FOC system of FIG. 5.

Accordingly, $i_\alpha$ and $i_\beta$ are transformed to a two-dimensional rotating frame of reference 560 (see FIG. 10) that is aligned and synchronized with the rotating rotor. In this reference frame, a first (direct) axis, d, is oriented along (i.e., directly aligned with) the rotor flux vector, and a second (quadrature) axis, q, is oriented at 90 degrees from the first axis. Note that the q axis is the direction in which the maximum torque is generated. A benefit of the rotating reference frame is that the axes are stationary relative to the rotor, and the component vectors will now be generally constant or slow-changing (i.e., DC currents), as shown in FIG. 11. To accomplish this simplification, Ia and i are converted into $i_d$ and $i_q$, using the Park Transformation 570 (known in the art, and also referred to as the Forward Park Transformation).

At this point, $i_d$ and $i_q$ can be handled independently to manipulate the net current vector. It should be clear that any non-zero magnitude of $i_d$ will alter the net current vector from the quadrature (i.e., maximum-torque) direction. Accordingly, during normal operation, $i_d$ is usually commanded to be zero while $i_q$ is controlled in accordance with desired torque. With continuing reference to FIG. 5, the measured $i_d$ and $i_q$ are compared to the commanded $i_d$ and $i_q$, and respective proportional-integral (PI) controllers $PI_\alpha$ and $PI_q$ are utilized to determine the corresponding $V_d$ and $V_q$. These voltage values are then passed through modules (labeled $PARK^{-1}$ and $2\varphi \rightarrow \varphi$) that perform an Inverse Park Transformation and an Inverse Clarke Transformation to convert them back to the α, β stationary reference frame and finally to the three phase values needed for applying stator voltages $V_U$, $V_V$, and $V_W$.

The question remains what the commanded $i_d$ and $i_q$ should be. As depicted in FIG. 5, system 500 includes an intelligent regeneration controller module 510 that takes the commanded flux (direct) current $i_d$, the commanded torque (quadrature) current $i_q$, and the battery bus voltage, and determines the proper desired flux current to protect the battery from an over-voltage condition.

Commanded torque will depend on the desired speed and direction of the motor, as commanded by the user/rider. For example, in vehicles 10, 100, torque commands will be based on the tilt angle or orientation of the board, which is generally caused by user action. The flux command, on the other hand, depends on how much the system needs to weaken the overall flux, reduce the torque, and/or redirect excess current.

In some examples, FOC system 500 further comprises a vibration controller 580 configured to send vibrational impulses to the motor. Vibration controller 580 is configured to modify the stator voltage in the quadrature force direction in response to measured and/or determined conditions. In the example of FIG. 5, vibration controller 580 receives estimated speed values from position and speed estimator 520 (also referred to as a speed estimator circuit, a speed estimator module, and/or speed estimation processing logic). Based on the estimated speed values, vibration controller 580 may add vibrational impulses to the quadrature voltage value $V_q$ before it is passed through the Inverse Park Transformation module $PARK^{-1}$, thereby modulating the quadrature voltage $V_q$. In this manner, the quadrature voltage $V_q$ is modulated without disturbing the current/torque regulation performed by the torque controller $PI_q$. However, as described above in the Overview, vibration controller 580 may send vibration impulses based on a variety of conditions. Accordingly, in some examples, vibration controller is coupled to a torque sensor, a battery charge sensor (e.g., power supply management system 300), and/or the like.

In some examples, vibration controller 580 induces vibration in the motor by applying a positive square wave impulse to the quadrature voltage $V_q$, immediately followed by applying a negative square wave impulse to the quadrature voltage $V_q$. The positive square wave impulse and the negative square wave impulse may be applied at any suitable frequency, such as at from 450 Hz to 500 Hz, approximately 485 Hz, and/or the like. In some examples, a width of the positive impulse is 313 microseconds, and a width of the negative impulse is 313 microseconds. However, impulses may have any suitable width and/or frequency. Furthermore, any suitable method of adding an impulse to the motor may be utilized to induce vibration.

D. Illustrative Method

Figure 12:
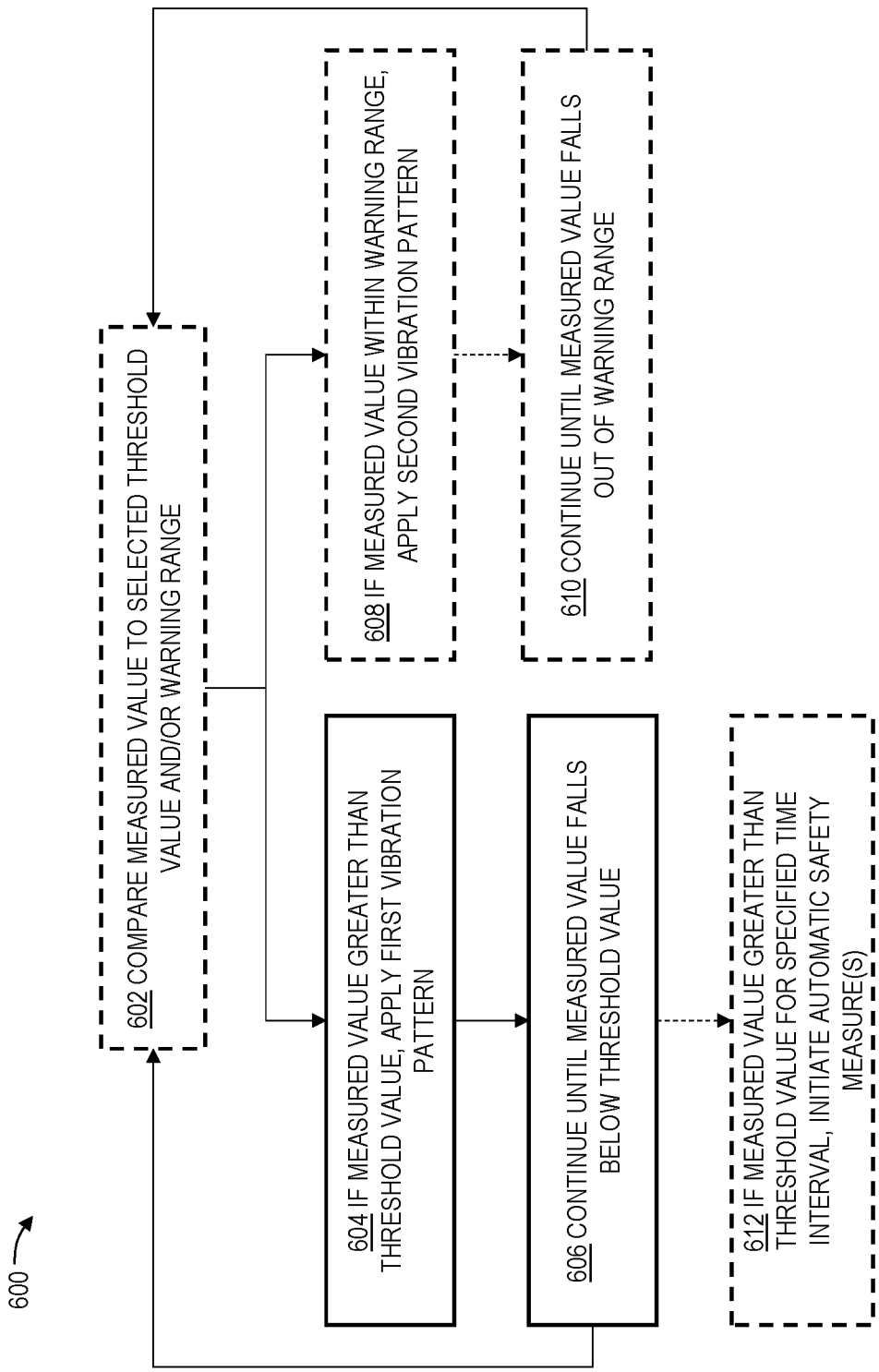
FIG. 12 is a flowchart depicting steps of an illustrative method for vibrational notification using an FOC system according to the present teachings.
Figure 13:
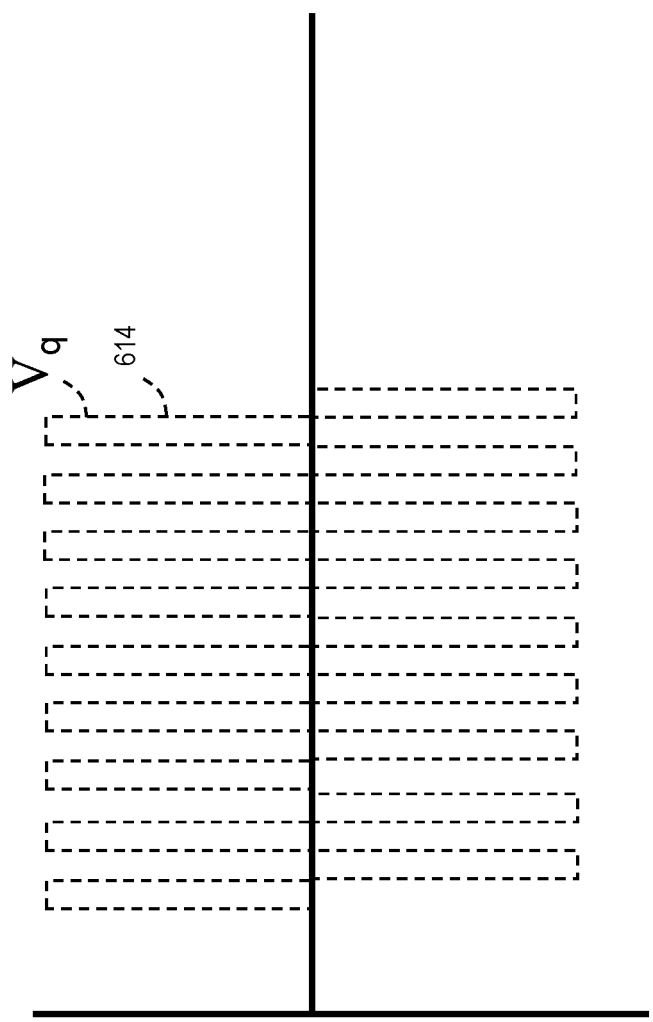
FIG. 13 is a schematic diagram depicting a first illustrative vibration pattern suitable for notifying a rider according to aspects of the present disclosure.

This section describes steps of an illustrative method 600 for vibrational notification of riders of a self-balancing electric vehicle; see FIG. 12. Aspects of vibration controller 580, system 500, and/or vehicles 10, 100 may be utilized in the method steps described below. Where appropriate, reference may be made to components and systems that may be used in carrying out each step. These references are for illustration, and are not intended to limit the possible ways of carrying out any particular step of the method.

Step 602 of method 600 includes optionally comparing a measured value to an operational threshold value. In some examples, step 602 of method 600 includes receiving, at a motor controller of the self-balancing electric vehicle, the measured value. In some examples, the measured value corresponds to a first parameter of the self-balancing electric vehicle. In some examples, the measured value is a speed of the self-balancing electric vehicle, and is received from a speed sensor or speed estimator, such as position and speed estimator 520. In these examples, the operational threshold value is a maximum speed threshold. In some examples, the measured value is a torque of the self-balancing electric vehicle, and is received from a torque sensor. In these examples, the operational threshold value is a maximum safe torque. In some examples, the measured value is a battery charge level, and is received from a battery bus, such as the battery bus of FIG. 5. In these examples, the operational threshold value is a minimum safe battery charge. In some examples, comparing the measured value to the operational threshold value is performed by a controller, such as vibration controller 580. In some examples, the measured value is a hardware status of the self-balancing electric vehicle. In these examples, the operational threshold value is an error code communicated to the vibration controller by, e.g., power supply management system 300, rider detection 262, intelligent regeneration controller 510, and/or the like.

The operational threshold value may be provided by any suitable source. In some examples, the operational threshold value is set by the manufacturer, and may not be modified by the rider and/or user. In some examples, such as when the rider is a beginner and/or a child, the operational threshold value may be lowered and/or modified by a user interface, such as a software application running on a user's smartphone or other mobile device, controls integrated within the self-balancing electric vehicle, and/or the like. In some examples, the operational threshold may be automatically modified based on measured values, such as a battery health of the battery, a tire pressure of a ground-contacting element, and/or the like.

In some examples, step 602 of method 600 further comprises comparing the measured value to a warning range. The warning range may include a range of values below the operational threshold value. In some examples, the warning range includes a range of values between a first operational threshold value and a second operational threshold value. The warning range may be within any suitable interval of the first operational threshold value, such as 5%, 10%, 20%, and/or the like. In examples wherein the first operational threshold value is a minimum safe battery charge, the warning range may correspond to an estimated number of minutes of ride time remaining, such as approximately five minutes, approximately ten minutes, approximately fifteen minutes, approximately twenty minutes, and/or the like.

In some examples, step 602 further comprises operating the self-balancing electric vehicle.

Step 604 of method 600 includes applying a first vibration pattern (AKA pattern of vibrational impulses) if the measured value satisfies the operational threshold value. The first vibration pattern may comprise any suitable pattern of repeated impulses, which is configured to not disturb the current and torque regulation of the vehicle. In some examples, the operational threshold value is a maximum speed threshold, and step 604 includes applying a first vibration pattern to notify a rider that a maximum speed threshold has been exceeded. The first vibration pattern may comprise any suitable pattern, such as periodic, continuous, rhythmic, increasing in frequency, decreasing in frequency, and/or the like. In some examples, the first vibration pattern comprises a continuous vibration and/or buzzing, such as the pattern 614 depicted in FIG. 13. Accordingly, the motor may vibrate continuously when the measured speed is equal to or greater than the maximum speed threshold. In some examples, the operational threshold value is a maximum safe torque, and step 604 includes applying a first vibration pattern to notify a rider that a maximum safe torque has been exceeded. In some examples, the operational threshold value is a minimum charge threshold, and step 604 includes applying a first vibration pattern to notify a rider that the measured charge has dropped below the minimum charge threshold.

In some examples, applying a first vibration pattern includes increasing and decreasing a virtual quadrature voltage $V_q$ applied to the motor. In other words, the stator voltage in the quadrature force direction $V_q$ is modified. In some examples, the first vibration includes alternating positive square wave impulses and negative square wave impulses at any suitable frequency, such as from 450 Hz to 500 Hz, approximately 485 Hz, and/or the like. In some examples, a width of the positive impulse is 313 microseconds, and a width of the negative impulse is 313 microseconds.

Step 606 of method 600 includes continually applying the first vibration pattern until the measured value no longer satisfies (e.g., no longer exceeds, exceeds) the operational threshold value. In some examples, step 606 includes continually, repeatedly, and/or periodically comparing the measured value to the operational threshold value and ceasing vibration in response to the measured value falling below the operational threshold value.

Figure 14:
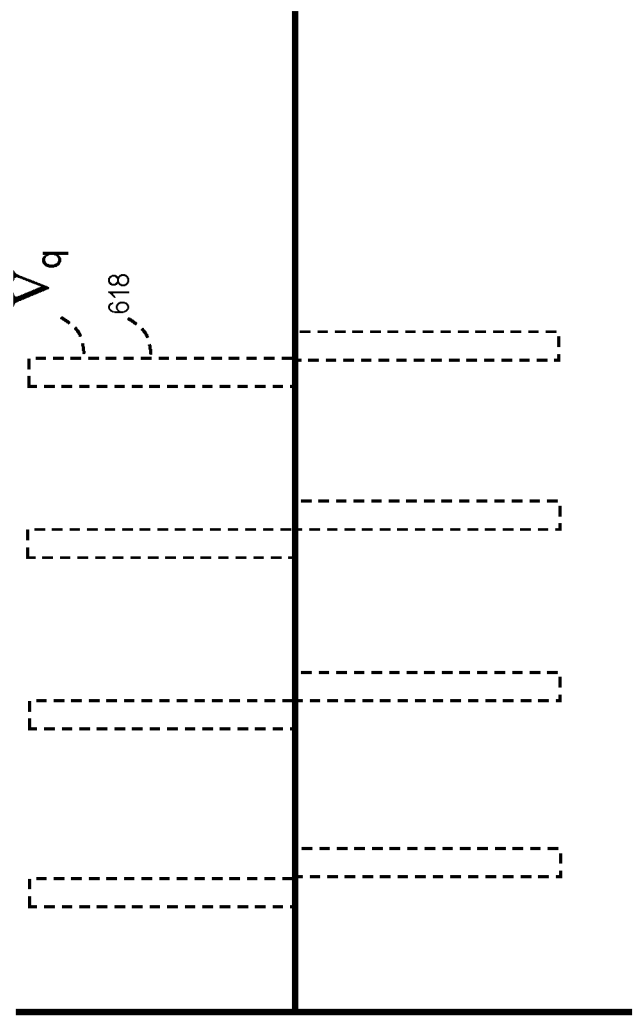
FIG. 14 is a schematic diagram depicting a second illustrative vibration pattern suitable for notifying a rider according to aspects of the present disclosure.

In some examples, step 608 of method 600 includes optionally applying a second vibration pattern (AKA pattern of vibrational impulses) if the measured value is within the warning range and/or satisfies the second operational threshold value. The second vibration pattern may comprise any suitable pattern of repeated impulses, which is configured not to disturb the current and torque regulation of the vehicle. The second vibration pattern may comprise any suitable pattern, such as periodic, continuous, rhythmic, increasing in frequency, decreasing in frequency, and/or the like. In some examples, the second vibration pattern is different from the first vibration pattern. In some examples, the operational threshold value is the maximum speed threshold, and the warning range is a specified range of speeds below the maximum speed threshold. In some examples, the motor may vibrate in a periodic pattern when the measured speed is within the warning range, such as the pattern 616 depicted in FIG. 14. In some examples, the motor may vibrate in a 5 Hz pattern when the measured speed is from 90% to 99% of the maximum speed threshold. In some examples, the motor may vibrate in a 5 Hz pattern when the measured speed is from 80% to 99% of the maximum speed threshold. In some examples, a frequency of the vibrations may increase as the measured speed approaches the maximum speed threshold.

In some examples, the operational threshold value is a minimum safe battery charge, and the warning range is a specified range of battery charge above the operational threshold value. In some examples, the motor may vibrate in a rhythmic pattern configured to indicate that the battery is nearly discharged, such as the pattern 618 depicted in FIG. 15. In the example depicted in FIG. 15, the motor emits three impulses, followed by a pause. However, any suitable rhythmic pattern and/or number of impulses may be utilized, such as two impulses, three impulses, four impulses, five impulses, patterns of two impulses followed by one impulse, and/or the like. In some examples, the motor may vibrate to indicate that the battery has a charge of 5%, 10%, 15%, 20%, and/or the like. In some examples, the motor may vibrate to indicate that the battery has approximately 5 minutes, 10 minutes, 15 minutes, 20 minutes, and/or the like of ride time remaining.

In some examples, step 610 of method 600 includes continually applying the second vibration pattern until the measured value falls out of the warning range. In some examples, step 610 includes continually, repeatedly, and/or periodically comparing the measured value to endpoints of the warning range and ceasing vibration in response to the measured value falling outside of the warning range.

In some examples, optional step 612 of method 600 includes automatically initiating an operational measure if the measured value is greater than the operational threshold value for a specified time interval. Automatic safety measures may include over-voltage prevention systems, such as those described in U.S. Pat. No. 10,293,243, the entirety of which is hereby incorporated herein for all purposes; speed limiting systems; "pushback" measures; and/or the like. For example, if a measured speed of the self-driving vehicle is greater than the maximum speed threshold for 10 seconds, the method may include automatically initiating "pushback" measures.

C. Illustrative Combinations and Additional Examples

This section describes additional aspects and features of vibrational notification systems, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A0. A method for vibrationally notifying a rider of a self-balancing electric vehicle, the method comprising:
operating a self-balancing electric vehicle;
receiving, at a motor controller of a self-balancing electric vehicle, a measured value corresponding to a first parameter of the self-balancing electric vehicle; and
applying a first pattern of vibrational impulses to a motor of the self-balancing electric vehicle in response to the self-balancing electric vehicle satisfying a first operational threshold value.

A1. The method of paragraph A0, further comprising continually applying the first pattern of vibrational impulses until the measured value does not satisfy first operational threshold value.

A2. The method of paragraph A0 or A1, further comprising applying a second pattern of vibrational impulses to the motor of the self-balancing electric vehicle if the measured value satisfies a second operational threshold value.

A3. The method of paragraph A2, wherein the first operational threshold value and the second operational threshold value define endpoints of a warning range.

A4. The method of paragraph A2, wherein the second pattern of vibrational impulses is different from the first pattern of vibrational impulses.

A5. The method of paragraph A3 or A4, further comprising continually applying the second pattern of vibrational impulses until the measured value does not satisfy the second operational threshold value.

A6. The method of any of paragraphs A0 through A5, wherein applying the first pattern of vibration impulses comprises sequentially increasing and decreasing a quadrature voltage applied to the motor.

A7. The method of paragraph A6, wherein increasing and decreasing the quadrature voltage applied to the motor includes applying a positive square wave impulse followed by a negative square wave impulse.

A8. The method of any of paragraphs A0 through A7, wherein the first parameter is a speed of the self-balancing electric vehicle, wherein the measured value is a measured speed of the self-balancing electric vehicle, and wherein the first operational threshold value is a maximum speed threshold of the self-balancing electric vehicle.

A9. The method of any of paragraphs A0 through A7, wherein the first parameter is a torque of the self-balancing electric vehicle, wherein the measured value is a torque of the motor, and wherein the first operational threshold value is a maximum safe torque.

A10. The method of any of paragraphs A0 through A7, wherein the measured value is a state of charge of a battery of the self-balancing electric vehicle, and wherein the operational threshold value is a minimum charge threshold.

A10. The method of any of paragraphs A2 through A5, wherein the measured value is a speed of the self-balancing electric vehicle, and wherein the warning range is within 90% to 99% of the maximum speed threshold.

A11. The method of any of paragraphs A2 through A5, wherein the measured value is a torque of the motor, and wherein the warning range is within 90% to 99% of the maximum safe torque.

A13. The method of any of paragraphs A0 through A11, wherein the measured value is the status of the self-balancing electric vehicle, and wherein the operational threshold value is the presence of an error code.

B0. A vibrational notification system for a self-balancing electric vehicle, the system comprising:
a motor; and
a motor controller comprising a field-oriented control module including a vibration controller configured to send vibrational impulses to the motor;
wherein the vibrational impulses comprise increases and decreases in a quadrature voltage applied to the motor.

B1. The vibrational notification system of paragraph B0, further comprising a position and speed estimator coupled to the vibration controller, wherein the position and speed estimator is configured to send a measured speed of the self-balancing electric vehicle to the vibration controller.

B2. The vibrational notification system of paragraph B1, wherein the vibration controller is configured to send vibrational impulses to the motor in response to the measured speed satisfying a threshold speed.

B3. The vibrational notification system of any of paragraphs B0 through B2, wherein the increases and decreases in the quadrature voltage applied to the motor comprise positive square wave impulses and negative square wave impulses.

B4. The vibrational notification system of any of paragraphs B0 through B3, further comprising a power supply management system coupled to the vibration controller, wherein the power supply management system is configured to send a state of charge of a battery of the self-balancing electric vehicle to the vibration controller.

B5. The vibrational notification system of paragraph B4, wherein the vibration controller is configured to compare the state of charge to a threshold charge, and wherein the vibration controller is configured to send vibrational impulses to the motor in response to the state of charge satisfying a threshold charge.

C0. A self-balancing electric vehicle comprising:
a wheel having an axis of rotation;
a board including a frame having an aperture to accommodate the wheel, such that the board is tiltable about the wheel, first and second deck portions of the board each configured to receive a left or right foot of a rider oriented generally perpendicular to a direction of travel of the board;
an electric hub motor configured to drive the wheel; and
a motor controller comprising a field-oriented control module including a vibration controller configured to send vibrational impulses to the electric hub motor;
wherein the vibrational impulses comprise increases and decreases in a quadrature voltage applied to the electric hub motor.

C1. The self-balancing electric vehicle of paragraph C0, further comprising a position and speed estimator coupled to the vibration controller, wherein the position and speed estimator is configured to send a measured speed of the self-balancing electric vehicle to the vibration controller.

C2. The self-balancing electric vehicle of paragraph C1, wherein the vibration controller is configured to compare the measured speed to a threshold speed, and wherein the vibration controller is configured to send vibrational impulses to the motor in response to the measured speed exceeding the threshold speed.

C3. The self-balancing electric vehicle of any of paragraphs C0 through C2, wherein the increases and decreases in a quadrature voltage applied to the electric hub motor comprise positive and negative square wave impulses.

D0. The vehicle and/or method of any of the above paragraphs A0 through C3, wherein the vibrational impulses have a frequency configured to excite a mechanical resonant frequency of a frame (or other portion) of the vehicle.

Advantages, Features, and Benefits

The different embodiments and examples of the vibrational notification systems described herein provide several advantages over known solutions for communicating with riders of self-balancing electric vehicles. For example, illustrative embodiments and examples described herein notify a rider without (or in addition to) visual cues, allowing the rider to focus on the road.

Additionally, and among other benefits, illustrative embodiments and examples described herein cause the self-balancing vehicle to vibrate without disturbing the motor current/torque modulation.

Additionally, and among other benefits, illustrative embodiments and examples described herein facilitate providing meaningful haptic/audible/vibrational feedback to the rider without the need for hardware such as speakers, speaker drivers, etc. This may simplify manufacturing, reduce weight and complexity, and improve maintainability of the overall vehicle as compared with systems requiring such additional hardware.

No known system or device can perform these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A method for vibrationally notifying a rider of a self-balancing electric vehicle, the method comprising:
   operating the self-balancing electric vehicle;
   receiving, at a motor controller of the self-balancing electric vehicle, a measured value corresponding to a first parameter of the self-balancing electric vehicle;
   operating a motor of the self-balancing electric vehicle to rotate a ground-contacting element of the self-balancing electric vehicle and propel the self-balancing electric vehicle; and
   in response to the self-balancing electric vehicle satisfying a first operational threshold value, generating a vibrational notification by applying, using the motor controller, a first pattern of vibrational impulses to the motor by sequentially increasing and decreasing a quadrature voltage applied to the motor,
   wherein increasing and decreasing the quadrature voltage applied to the motor includes applying a positive square wave impulse followed by a negative square wave impulse, and wherein the first pattern of vibrational impulses are configured to avoid disturbing current and torque regulation of the self-balancing electric vehicle, wherein the first pattern of vibrational impulses are added to the quadrature voltage after the torque regulation performed by a torque controller.

2. The method of claim 1, further comprising continually applying the first pattern of vibrational impulses until the measured value no longer satisfies the first operational threshold value.

3. The method of claim 1, further comprising applying a second pattern of vibrational impulses to the motor of the self-balancing electric vehicle in response to the measured value satisfying a second operational threshold value.

4. The method of claim 3, wherein the first operational threshold value and the second operational threshold value define endpoints of a warning range.

5. The method of claim 3, wherein the second pattern of vibrational impulses is different than the first pattern of vibrational impulses.

6. The method of claim 5, further comprising continually applying the second pattern of vibrational impulses until the measured value no longer satisfies the second operational threshold value.

7. The method of claim 1, wherein the first parameter is a speed of the self-balancing electric vehicle, wherein the measured value is a measured speed of the self-balancing electric vehicle, and wherein the first operational threshold value is a selected warning speed of the self-balancing electric vehicle.

8. The method of claim 1, wherein the first parameter is a torque of the self-balancing electric vehicle, wherein the measured value is a torque of the motor, and wherein the first operational threshold value is a selected warning torque.

9. A vibrational notification system for a self-balancing electric vehicle, the system comprising:
   a motor configured to rotate a ground-contacting element of the self-balancing electric vehicle and propel the self-balancing electric vehicle; and
   a motor controller configured to drive the motor and comprising a field-oriented control module including a vibration controller configured to send vibrational impulses to the motor while the motor is driving the ground-contacting element;
   wherein the vibrational impulses comprise increases and decreases in a quadrature voltage applied to the motor, wherein the vibrational impulses are added to the quadrature voltage after torque regulation performed by a torque controller.

10. The vibrational notification system of claim 9, wherein the vibrational impulses have a frequency configured to excite a mechanical resonant frequency of a frame of the self-balancing electric vehicle.

11. The vibrational notification system of claim 9, wherein the vibration controller is configured to send the vibrational impulses to the motor in response to a measured vehicle speed satisfying a threshold speed.

12. The vibrational notification system of claim 9, wherein the increases and decreases in the quadrature voltage applied to the motor comprise positive square wave impulses and negative square wave impulses, respectively.

13. The vibrational notification system of claim 9, further comprising a power supply management system coupled to the vibration controller, wherein the power supply management system is configured to send a state of charge of a battery of the self-balancing electric vehicle to the vibration controller.

14. The vibrational notification system of claim 13, wherein the vibration controller is configured to send the vibrational impulses to the motor in response to the state of charge satisfying a threshold charge.

15. The vibrational notification system of claim 9, wherein the vibration controller receives an estimated speed value, and the vibration controller applies the vibrational impulses to the quadrature voltage based on the estimated speed value.

16. A self-balancing electric vehicle comprising:
a wheel having an axis of rotation;
a board including a frame having an aperture to accommodate the wheel, such that the board is tiltable about the wheel, first and second deck portions of the board each configured to receive a left or right foot of a rider oriented generally perpendicular to a direction of travel of the board;
an electric hub motor configured to drive the wheel; and
a motor controller configured to drive the electric hub motor and comprising a field-oriented control module including a vibration controller configured to send vibrational impulses to the electric hub motor while driving the electric hub motor;
wherein sending the vibrational impulses comprises increasing and decreasing a quadrature voltage applied to the electric hub motor, wherein the vibrational impulses are added to the quadrature voltage after torque regulation performed by a torque controller.

17. The self-balancing electric vehicle of claim 16, further comprising a speed estimator circuit configured to send a measured speed of the self-balancing electric vehicle to the vibration controller.

18. The self-balancing electric vehicle of claim 17, wherein the vibration controller is configured to send the vibrational impulses to the electric hub motor in response to the measured speed satisfying a threshold speed.

19. The self-balancing electric vehicle of claim 16, wherein the increases and decreases in the quadrature voltage applied to the electric hub motor comprise positive and negative square wave impulses.

20. The self-balancing electric vehicle of claim 16, wherein the vibrational impulses have a frequency configured to excite a mechanical resonant frequency of the frame.

* * * * *